United States Patent
Burghardt et al.

(10) Patent No.: US 12,153,120 B2
(45) Date of Patent: Nov. 26, 2024

(54) RADAR ODOMETRY SYSTEM AND METHOD

(71) Applicant: Joby Aero, Inc., Santa Cruz, CA (US)

(72) Inventors: Michael Burghardt, Santa Cruz, CA (US); Jahshan Bhatti, Santa Cruz, CA (US); Donnie Smith, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 577 days.

(21) Appl. No.: 17/446,602

(22) Filed: Aug. 31, 2021

(65) Prior Publication Data

US 2022/0066015 A1    Mar. 3, 2022

Related U.S. Application Data

(60) Provisional application No. 63/072,472, filed on Aug. 31, 2020.

(51) Int. Cl.
| | |
|---|---|
| *G01S 13/60* | (2006.01) |
| *G01S 7/295* | (2006.01) |
| *G01S 13/58* | (2006.01) |

(52) U.S. Cl.
CPC .............. *G01S 13/60* (2013.01); *G01S 7/295* (2013.01); *G01S 13/582* (2013.01)

(58) Field of Classification Search
CPC ......... G01S 13/60; G01S 7/295; G01S 13/582
See application file for complete search history.

(56) References Cited

U.S. PATENT DOCUMENTS

| | | | |
|---|---|---|---|
| 2010/0204867 A1* | 8/2010 | Longstaff | G01S 13/933 |
| | | | 701/26 |
| 2016/0139254 A1* | 5/2016 | Wittenberg | G01S 13/343 |
| | | | 342/27 |
| 2018/0172815 A1 | 6/2018 | Mckitterick | |
| 2019/0094877 A1 | 3/2019 | Smith et al. | |
| 2019/0098457 A1 | 3/2019 | Perdew et al. | |
| 2019/0250249 A1 | 8/2019 | Raphaeli et al. | |

(Continued)

OTHER PUBLICATIONS

"International Application Serial No. PCT US2021 071329, International Search Report mailed Dec. 27, 2021", 2 pgs.

(Continued)

*Primary Examiner* — Bernarr E Gregory
*Assistant Examiner* — Hailey R Le
(74) *Attorney, Agent, or Firm* — SCHWEGMAN LUNDBERG & WOESSNER, P.A.

(57) ABSTRACT

A method for determining a position of a vehicle is provided. First and second signals having first and second frequencies are transmitted towards a target. First and second reflected signals corresponding to the first and second signals reflected from the target are received at first and second antennae, respectively. A first frequency difference between the first signal and the first reflected signal is determined. The first frequency difference corresponds to a first range between the vehicle and target. A second frequency difference between the second pulsed signal and the second reflected signal is determined. The second frequency difference corresponds to a second range between the vehicle and target. A vehicle velocity is based on the first range and the second range. A position of the vehicle is determined based on the velocity.

20 Claims, 23 Drawing Sheets

(56) References Cited

U.S. PATENT DOCUMENTS

| | | | |
|---|---|---|---|
| 2019/0353780 A1 | 11/2019 | Statnikov | |
| 2020/0411960 A1* | 12/2020 | Ng | H01Q 21/0025 |
| 2021/0048520 A1* | 2/2021 | Wang | H03L 7/18 |
| 2022/0224380 A1* | 7/2022 | Lee | H04B 7/0695 |

OTHER PUBLICATIONS

"International Application Serial No. PCT US2021 071329, Written Opinion mailed Dec. 27, 2021", 11 pgs.

"International Application Serial No. PCT US2021 071329, International Preliminary Report on Patentability mailed Mar. 9, 2023", 13 pgs.

* cited by examiner

RADAR ODOMETRY SYSTEM AND METHOD

CROSS-REFERENCE TO RELATED APPLICATIONS

This application claims the benefit of U.S. Provisional Application No. 63/072,472, filed Aug. 31, 2020, entitled "RADAR ODOMETRY SYSTEM AND METHOD," which is incorporated herein by reference in its entirety.

TECHNICAL FIELD

This invention relates generally to the aviation field, and more specifically to a new and useful radar odometry method in the aviation field.

BACKGROUND

When a vehicle such as an aircraft is traveling, there is a need to know the position of the vehicle relative to the environment within which the vehicle is traveling. For example, a position of an aircraft is of the utmost importance in order to avoid the possibility of the aircraft having an accident during flight. Typically, when determining the position of a vehicle, such as an aircraft, four components are taken into consideration, accuracy, integrity, availability, and continuity. Accuracy relates to the difference between an actual position of the vehicle and the calculated position of the vehicle. Integrity is the reliability of the accuracy. Availability relates to how often the source, such as an accelerometer or a global positioning system (GPS), that is providing positional information is available. Continuity relates to the continuous accuracy of the positional measurements. In the GPS example, continuity can relate to how continuously accurate are the GPS measurements. While GPS is considered to provide true aircraft positioning, GPS does not have high integrity. Moreover, there are few reliable redundancies for GPS should failure occur with the GPS. Accordingly, what is needed is a system and method for positioning that is accurate, has high integrity and availability, and is continuous.

SUMMARY

Embodiments relate to using radar to determine a position of a vehicle, such as an aircraft. A system can include a transmitter and a plurality of antennae, where each antenna include a plurality of receivers. In an embodiment, as the vehicle travels in a first direction, the transmitter emits a plurality of signals that reflect from a target where the reflected signals are received by the plurality of receivers at the plurality of antennae. First frequency differences between the transmitted signal and a signal received from first receivers of a first antenna of the plurality of antennae can be used to determine a plurality of first ranges between the aircraft and the target. In an embodiment, the plurality of first ranges can be used to determine a first velocity and a first position. Thus, using the plurality of first ranges, a determination can be made regarding how ranges change over time for a first antenna in order to determine a velocity of the vehicle. Moreover, second frequency differences between the transmitted signal and a signal received from second receivers of a second antenna of the plurality of antennae can be used to determine a plurality of second ranges between the aircraft and the target. In an embodiment, the plurality of second ranges can be used to determine a second velocity and a second position. Thus, using the plurality of second ranges, a determination can be made regarding how ranges change over time for a second antenna in order to also determine a velocity of the vehicle. Based on the determination of how the first range and the second range change over time, a determination can be made how the range changes over each antenna. In particular, the first ranges for the first antenna can be compared against the second ranges for the second antenna in order to determine an angle. In an embodiment, the angle relates to an angle between the vehicle as it travels in the first direction and the target. In an embodiment, using ranges, the velocity, and the angle, a position of the vehicle can be determined.

Moreover, in an embodiment, a first frequency difference of the first frequency differences can be associated with a first value. The first value can correspond to a power associated with a reflected signal received at a first receiver of the first receivers. In addition, a second frequency difference of the second frequency differences can be associated with a second value. The second value can correspond to a power associated with a reflected signal received at a second receiver of the second receivers. In an embodiment, the first and second values can be compared with each other and a position determined with the reflected signal associated with the higher of the first value or the second value can be used as a nadir range pixel. To further illustrate, if the reflected signal received at the second receiver has a higher value (i.e., higher received power) than the reflected signal received at the first receiver, a position associated with the reflected signal at the second receiver can be used as the nadir range pixel.

BRIEF DESCRIPTION OF THE FIGURES

Some examples are illustrated by way of example and not limitation in the figures of the accompanying drawings.

DESCRIPTION OF THE PREFERRED EMBODIMENTS

Figure 1:
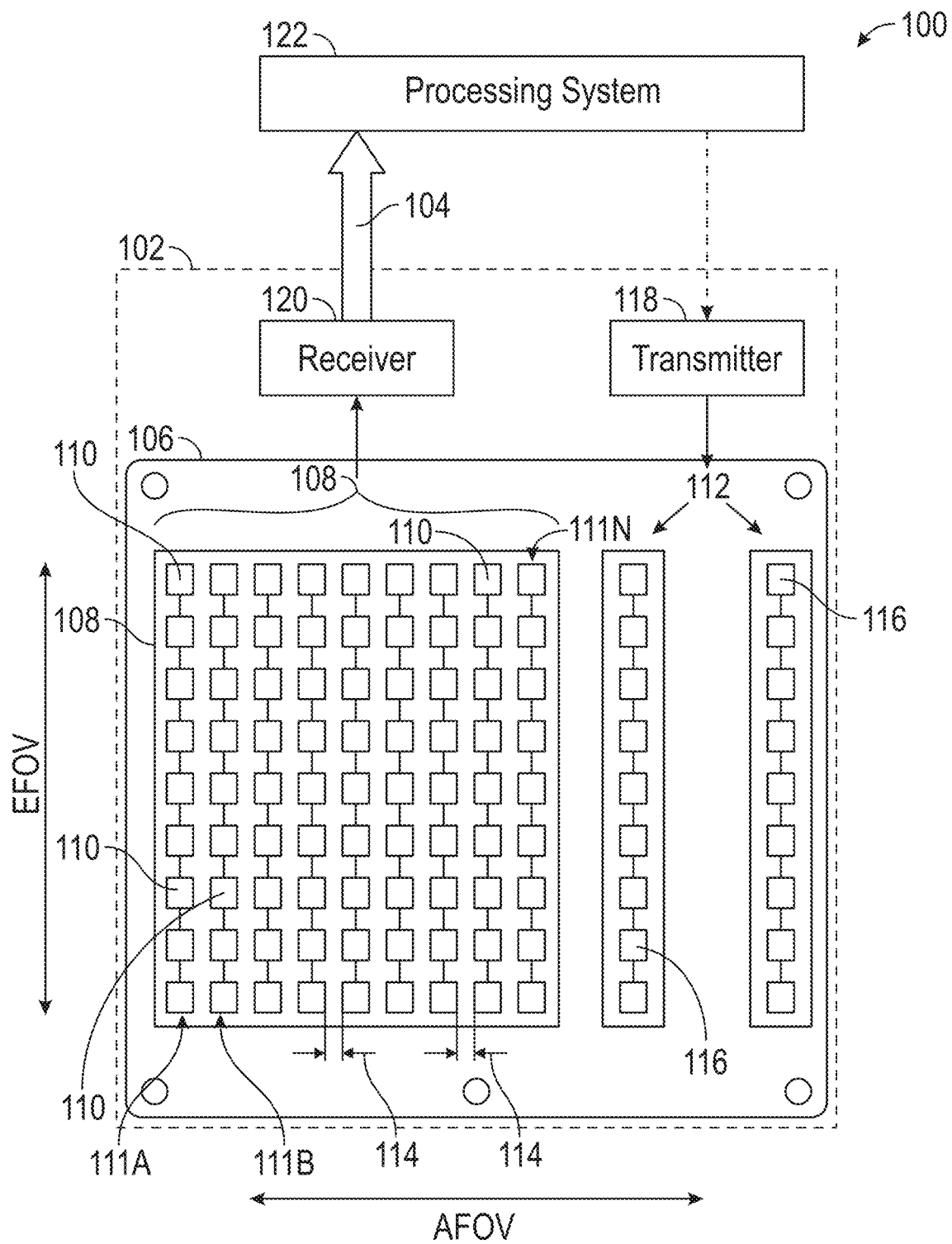
FIG. 1 is a schematic representation of a variant of the system, according to some examples.

The following description of the embodiments of this disclosure is not intended to limit this disclosure to these embodiments, but rather to enable any person skilled in the art to make and use embodiments disclosed herein.

"Field-of-View" can refer to an area that is viewable at any given moment. For example, azimuthal field-of-view can refer to an area that is viewable in right and left directions relative to a front of a vehicle. In addition, elevational field-of-view can refer to an area viewable between a bottom surface of the vehicle and a target.

"Frequency-modulated continuous wave radar" can relate to continuous wave radio energy that is transmitted and then received from any reflecting targets. Frequency-modulated continuous wave radar be can subdivided into long intervals ('fast time') spanning a period of a continuous waveform and short time intervals ('slow time') associated with a frequency modulation across a long interval.

Multiple-input and multiple-output "MIMO" is a method that multiplies radio link capacity using multiple transmission and receiving antennas. MIMO multiplies radio link capacity in order to exploit multipath propagation. MIMO can use a suite of wireless standards, including 3G, 4G, 5G, and LTE technologies. In an embodiment, MIMO can be used for azimuth resolution and elevation resolution.

Embodiments relate to using radar to determine a position of a vehicle, such as an aircraft. A system can include a transmitter and a plurality of antennae, where each of the antenna include a plurality of receivers. In an embodiment, as the vehicle travels in a first direction, the transmitter emits a plurality of signals that reflect from a target where the reflected signals are received by the plurality of receivers at the plurality of antennae. First frequency differences between the transmitted signal and a signal received from first receivers of a first antenna of the plurality of antennae can be used to determine a plurality of first ranges between the aircraft and the target. In an embodiment, the plurality of first ranges can be used to determine a first velocity and a first position. Thus, using the plurality of first ranges, a determination can be made regarding how ranges change over time for a first antenna in order to determine a velocity of the vehicle. Moreover, second frequency differences between the transmitted signal and a signal received from second receivers of a second antenna of the plurality of antennae can be used to determine a plurality of second ranges between the aircraft and the target. In an embodiment, the plurality of second ranges can be used to determine a second velocity and a second position. Thus, using the plurality of second ranges, a determination can be made regarding how ranges change over time for a second antenna in order to also determine a velocity of the vehicle. Based on the determination of how the first range and the second range change over time, a determination can be made how the range changes over each antenna. In particular, the first ranges for the first antenna can be compared against the second ranges for the second antenna in order to determine an angle. In an embodiment, the angle relates to an angle between the vehicle as it travels in the first direction and the target. In an embodiment, using ranges, the velocity, and the angle, a position of the vehicle can be determined.

In an embodiment, a first frequency difference of the first frequency differences can be associated with a first value. The first value can correspond to a power associated with a reflected signal received at a first receiver of the first receivers. In addition, a second frequency difference of the second frequency differences can be associated with a second value. The second value can correspond to a power associated with a reflected signal received at a second receiver of the second receivers. In an embodiment, the first and second values can be compared with each other and a position determined with the reflected signal associated with the higher of the first value or the second value can be used as a nadir range pixel. To further illustrate, if the reflected signal received at the second receiver has a higher value (i.e., higher received power) than the reflected signal received at the first receiver, a position associated with the reflected signal at the second receiver can be used as the nadir range pixel.

Now making reference to the Figures, and more specifically FIG. 1, embodiments employ a system 100 that can include a plurality of radar components and a processing system. However, the system 100 can additionally or alternatively include any other suitable set of components. For example, while the system 100 shows a plurality of radar components 102 for an azimuth field-of-view (AFOV), embodiments contemplate an additional system that is similar to the system 100 for use in an elevation field-of-view (EFOV). Moreover, the additional system for use in the EFOV can have similar componentry and the functionality described herein. Thus, in accordance with embodiments, a vehicle, such as an aircraft, can include multiples of the system 100. Throughout this disclosure, reference will be made to a vehicle and an aircraft. It should be noted that a vehicle may be construed as meaning an aircraft in this disclosure.

The plurality of radar components 102 can function to generate and process raw radar data 104. The raw radar data 104 can be in the frequency domain, which can be divided into any suitable time intervals associated with any suitable radar waveforms. For example, the raw radar data 104 can be generated by a frequency-modulated continuous wave radar (FMCW) that can be subdivided into long intervals ('fast time') spanning a period of a continuous waveform and short time intervals ('slow time') associated with a frequency modulation across a long interval. The raw radar data 104 can additionally include a spatial domain position, index, and/or angles (e.g., such as azimuthand/or elevation associated with the transmit and/or receive element). The plurality of radar components 102 can define any suitable set of radar nodes, such as a single radar node 106 or a plurality of radar nodes (e.g., 2, 3, more than 3). The radar node 106 can have any suitable distribution and/or arrangement about the aircraft. Preferably, radar nodes can be arranged on the bottom/underside of the aircraft (e.g., field of view oriented strictly below a horizontal plane of the aircraft) but can be otherwise arranged in any suitable position/arrangement. The radar nodes can include the same set of (intrinsic) viewing angles and/or view the same scene segments (e.g., region of terrain), or can have distinct ranges of viewing angles and/or view different scene segments. The viewing angle of each radar node 106 can be aimed downward (e.g., at a predetermined angle relative to the aircraft vertical axis, such as 0° or between 0° and 90°) and/or includes a vertically downward direction. However, the radar nodes can be otherwise suitably distributed and/or arranged.

The radar node 106 can include a continuous wave radar and a frequency-modulated continuous wave radar (FMCW), but can include any other suitable radar systems and/or radar components. The radar node 106 can be controlled in a phased array configuration, but can alternately be otherwise suitably operated and/or controlled. The radar node 106 can employ MIMO (multiple transmit elements, multiple receive elements), beamforming, and/or diversity to construct a virtual array, however the radar node 106 can be otherwise suitably configured. The radar node 106 (and/or MIMO arrays therein) can include any suitable set of viewing angles and/or field of view (FOV). In a specific example, the radar node 106 can include 12.8 deg EFOV and a 76.5 deg azimuthal field of view AFOV. Distinct radar nodes can include any suitable number of aligned arrays (e.g., elevation element arrays aligned, azimuthal elements aligned; receive and/or transmit elements parallel between distinct radar nodes) and/or can include co-located orthogonal arrays (e.g., within a predetermined distance on an aircraft, such as 10 cm, 20 cm, 50 cm). In a specific example, co-located orthogonal antenna arrays can enable improved detection of a diagonal aircraft translation (e.g., diagonal relative to a linear array). In variants, the radar node 106 can enable direct (local) position estimation when geo-motion occurs in aligned directions, such as by estimating velocity in aligned directions (relative to node arrays) and integrating to determine a (local) position along the aligned axis. Accordingly, in such variants, two orthogonal arrays can enable estimation of a 'diagonal' position which is not fully aligned with an individual node array. The radar nodes can also have any other suitable arrangement about the aircraft.

The plurality of radar components 102 can include a receiver antenna array 108 at the radar node 106. The radar antenna array 108 can function to transmit radio signals and can additionally or alternately function to receive radio signals. The receiver antenna array 108 can include any suitable FOV (e.g., azimuth or elevation), such as a 90° FOV, less than a 90° FOV, greater than a 90° FOV, and/or any other suitable FOV. In an embodiment, the receiver antenna array 108 can be sparse (e.g., element spacing is larger than half the wavelength), but can be otherwise suitably configured. In an embodiment, the receiver antenna array 108 can include multiple array elements, which can include antenna elements 110 having receivers and/or a transmitter array 112. In an embodiment, the antenna elements 110 can correspond to an antenna that can receive signals reflected from a target. Examples of antenna elements 110 that can be used can include series fed patch antenna element.

The receiver antenna array 108 can include multiple antenna elements arranged into one or more linear subarrays. The linear subarrays can be arranged in a linear array (e.g., orthogonal to the subarray's primary axis), but can alternatively be arranged orthogonal to another subarray, and/or otherwise suitably arranged. The linear subarrays can be equally-spaced within the array (e.g., which can enable Fast Fourier (FFT) in spatial domain) but can be otherwise arranged. In an example, the radar node 106 includes nine receive subarrays that correspond to the antenna elements 110, where each is associated with a different azimuth angle and each is arranged in parallel with a predetermined, uniform spacing 114 separating the parallel subarrays. In another example, each subarray has nine antenna elements with a different elevation field of view EFOV, with each element aligned along the primary axis and a predetermined, uniform spacing separating each of the antenna elements 110 (e.g., which can enable FFT in spatial domain). The receiver arrays can also be otherwise suitably configured.

The transmitter array 112 can include multiple transmitting elements 116 arranged into one or more linear subarrays. The linear subarrays can be aligned with the linear subarrays of the antenna elements 110 of the receiver antenna array 108, but can alternately be orthogonal, and/or otherwise suitably configured. When the system 100 includes multiple transmitter subarrays, the subarrays can be arranged in parallel, separated by a predetermined distance (e.g., N times the wavelength), or otherwise arranged. In an example, the radar node 106 can include two transmit subarrays and can include nine antenna elements, wherein the subarrays are arranged a predetermined distance apart. The transmitter arrays can also be otherwise suitably configured.

The plurality of radar components can also include any other suitable antenna with any other suitable configuration of transmit and/or receive components.

The plurality of radar components can include a transmitter 118, which functions to transmit a radar signal to be broadcast by the transmitting elements 116. The radar signal can be one that enables both range and range rate measurement, such as FMCW or pulse compressed, but can be any suitable radar signal. However, the system can include any other suitable transmitter.

The plurality of radar components can include a radar receiver 120 (such as a multi-channel radar receiver) which functions to convert the received radio signals into raw radar data to be interpreted by a processing system 122 of the system 100. The processing system 122 can employ any suitable signal filtering, amplification, demodulation, analog-digital conversion (e.g., can include an analog to digital converter or ADC), and/or any other suitable signal transformations. However, the processing system 122 can include any other suitable receiver which can be otherwise suitably configured.

In an example, the plurality of radar components includes a linear array with two transmit arrays (e.g., each including a linear subarray of nine antenna elements) having transmitting elements 116 and nine receive arrays (e.g., each including a linear subarray of nine antenna elements) having antenna elements 110, all arranged in parallel. MIMO and digital beamforming with multiple antenna elements can allow construction of a 15-element virtual array with 8.2 deg azimuthal resolution at boresight. However, the system can include any other suitable radar components and/or otherwise suitably generate raw radar data.

Figure 2:
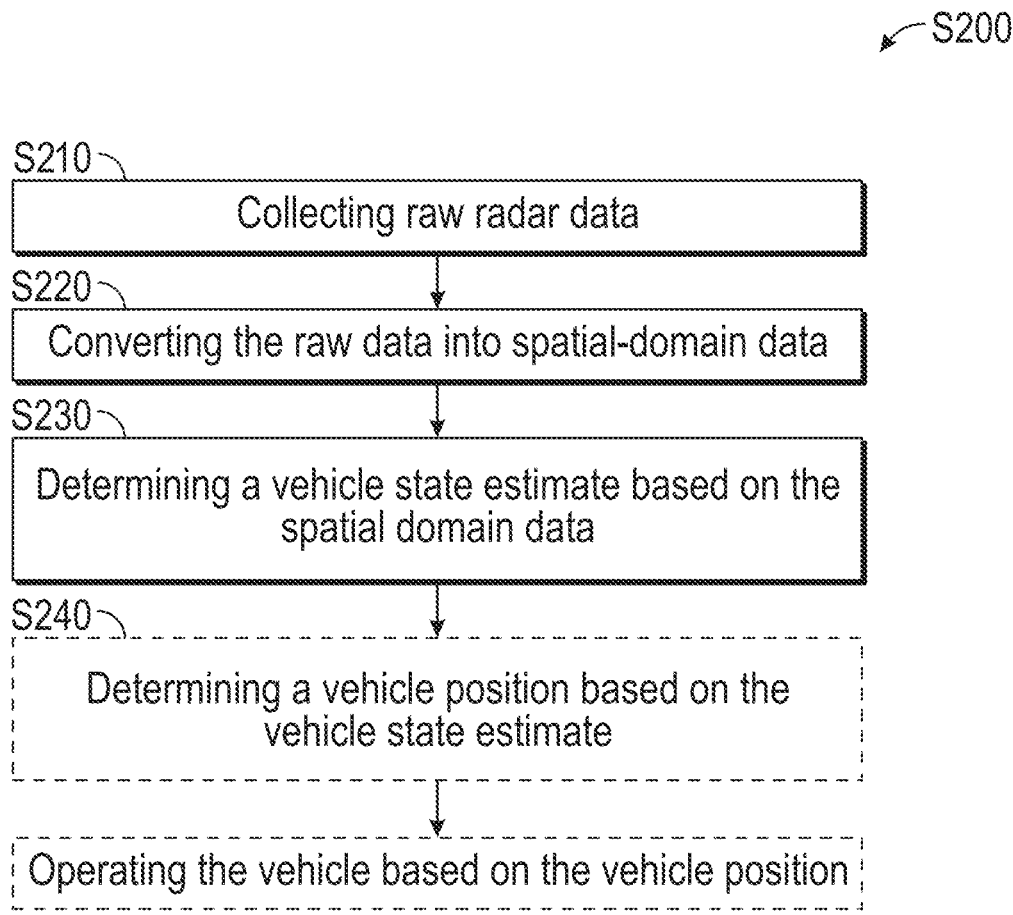
FIG. 2 is a diagrammatic representation of a variant of the method, according to some examples.

The processing system 122 can function to perform all or a portion of a method 200, shown with reference to FIG. 2. The processing system 122 can include a coherent radar IF processor but can additionally or alternatively include any other suitable components. The processing system 122 can generate a data cube based on the raw radar data from the radar components, but can perform any other portions of the method 200. The processing system 122 can be located on the aircraft and/or include any suitable extravehicular processing (e.g., map generation capabilities, etc.). However, the system can include any other suitable processing system.

The method 200, as shown in FIG. 2, can include: collecting raw radar data in operation 210, converting the raw data into spatial-domain data in operation 220, and determining a vehicle state estimate based on the spatial domain data in operation 230. The method 200 can optionally include determining a vehicle position based on the vehicle state estimate in operation 240, wherein the vehicle can be operated based on the vehicle position, as shown with reference to FIG. 2. However, the method 200 can additionally or alternatively include any other suitable elements. The method functions to generate a vehicle state estimate based on radar data and/or enable doppler odometry using raw radar data. It should be noted that the method 200 can be performed for both an azimuth direction of a vehicle and an elevation direction of a vehicle.

The method 200 can include collecting raw radar data during the operation 210, which functions to provide sensor input for determining various vehicle state parameters. Raw radar data can be provided in any suitable format, such as an array (or matrix) in the frequency domain (e.g., as provided by the receiver to the processing system). Raw radar data can be short interval bursts 302-310 (FIG. 3) collected in the form of images (or 'frames') corresponding to the raw radar data from a coherent processing interval (or long interval 300 in kHz, slow time interval 400 over time 402 in the examples in FIGS. 3 and 4) of the radar system. Within each coherent processing interval, the raw radar data can be sub-divided into a set of raw data blocks 404, an example of which is shown in FIG. 4. The blocks 404 within the coherent processing interval can convey data corresponding to frequency modulation across a short time interval 406 (or 'fast time' data) and across a given space 408, such as azimuth and elevation—each block 404 of raw radar data can represent the received ADC samples of one transmitted pulsed waveform from a single antenna (single receive antenna element). Accordingly, each raw radar data block 404 can correspond to an indexed position of the receive element, which maps to a predetermined azimuth angle and/or a predetermined elevation angle. As will be discussed in greater detail below, the raw radar data can thus be described as a 3D data cube in the frequency domain, with the following dimensions: spatial, fast time, and slow time. In variants, the 'spatial' dimension can be subdivided into an azimuth dimension and an elevation dimension based on the orientation of the indexed receive element (i.e., can be considered to convey data in two spatial dimensions). Each block 404 within the raw data cube for a single frame can include frequency domain data (e.g., amplitude, phase).

The raw data cube can be collected with any suitable type of radar signal (e.g., generated by any suitable antenna/transmitter/receiver combination), which can be pulsed (e.g., coherent pulsed), continuous wave, pulse doppler, FMCW (e.g., sawtooth, sinusoidal), and/or any other suitable type of signal. Collecting raw radar data can occur continuously and/or periodically by transmitting (e.g., using the transmitting antenna array) and receiving (e.g., with the receiver array) at any suitable radar systems and/or radar nodes on the aircraft, but can occur with any other suitable timing.

Figure 3:
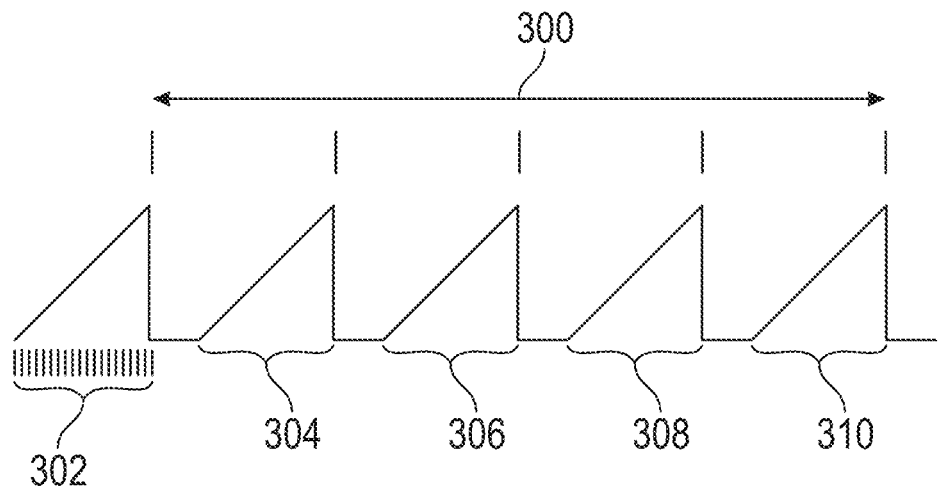
FIG. 3 is a schematic representation of a variant of the radar signal, according to some examples.
Figure 4:
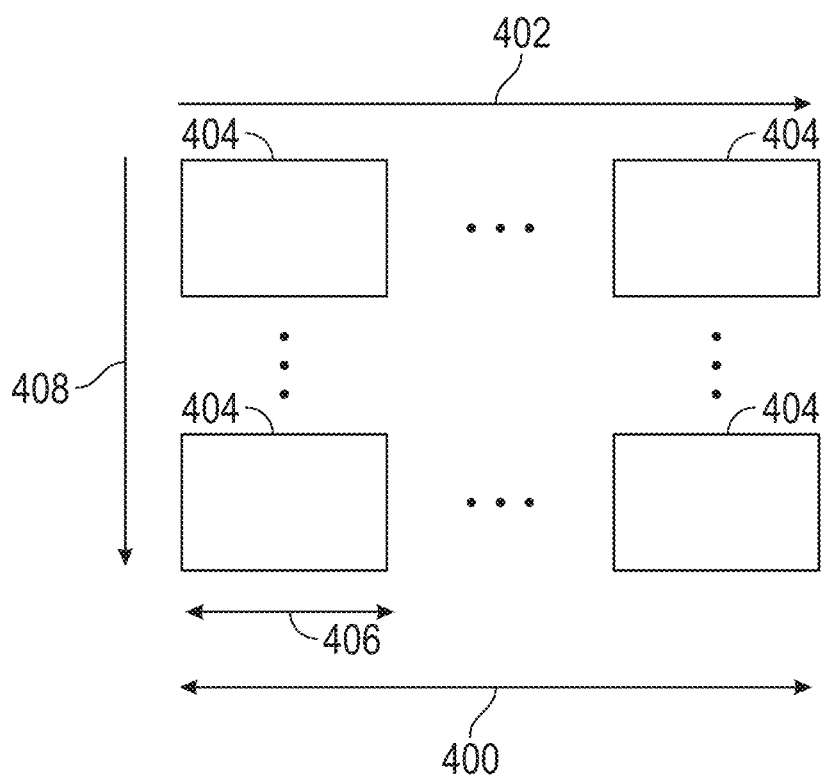
FIG. 4 is a schematic example of a variant of raw radar data for a single frame, according to some examples.

An example of the transmission signal is illustrated in FIG. 3.

An example of the raw radar data is illustrated in FIG. 4.

However, raw radar data can be otherwise suitably collected.

Figure 5:
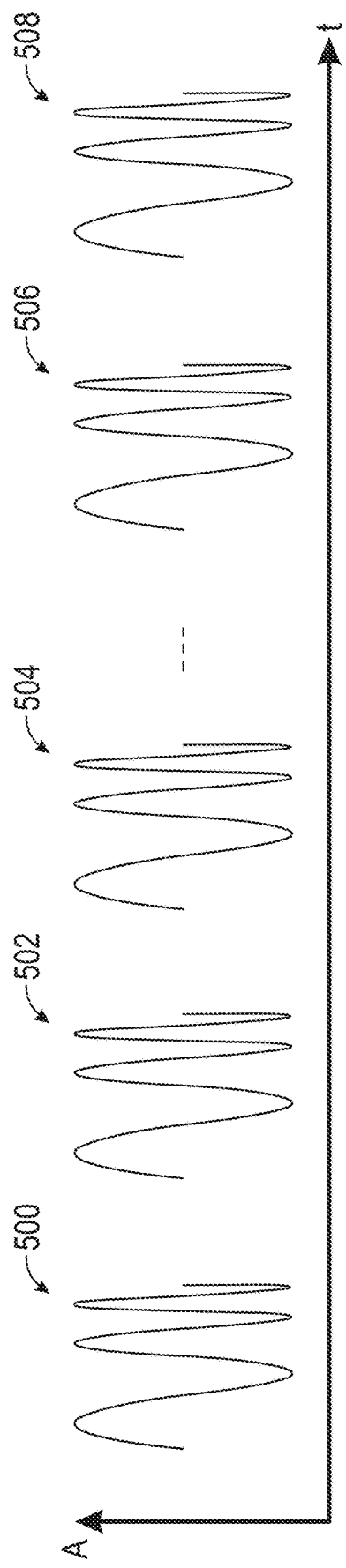
FIGS. 5-6B illustrate the capture of raw data, according to some examples.
Figure 6A:
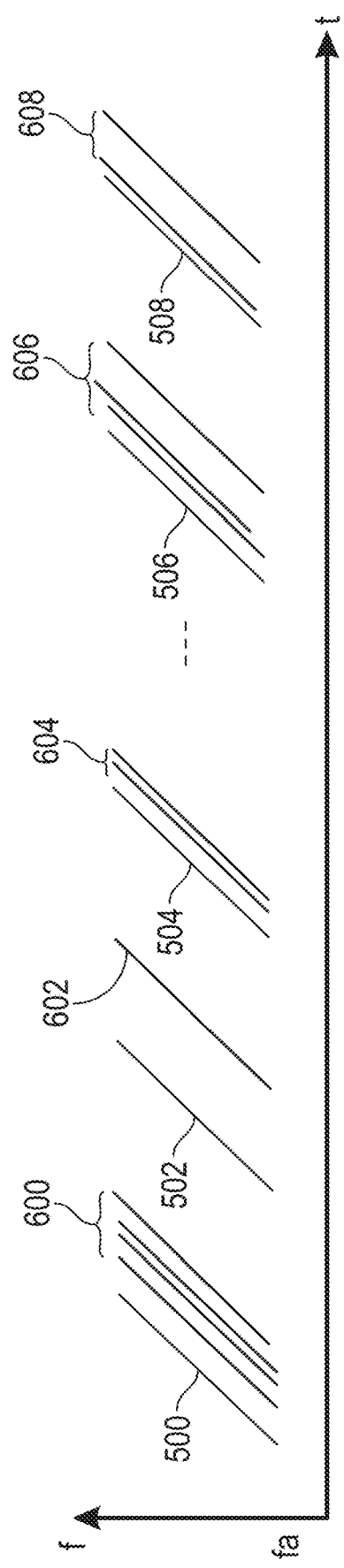
Figure 29:
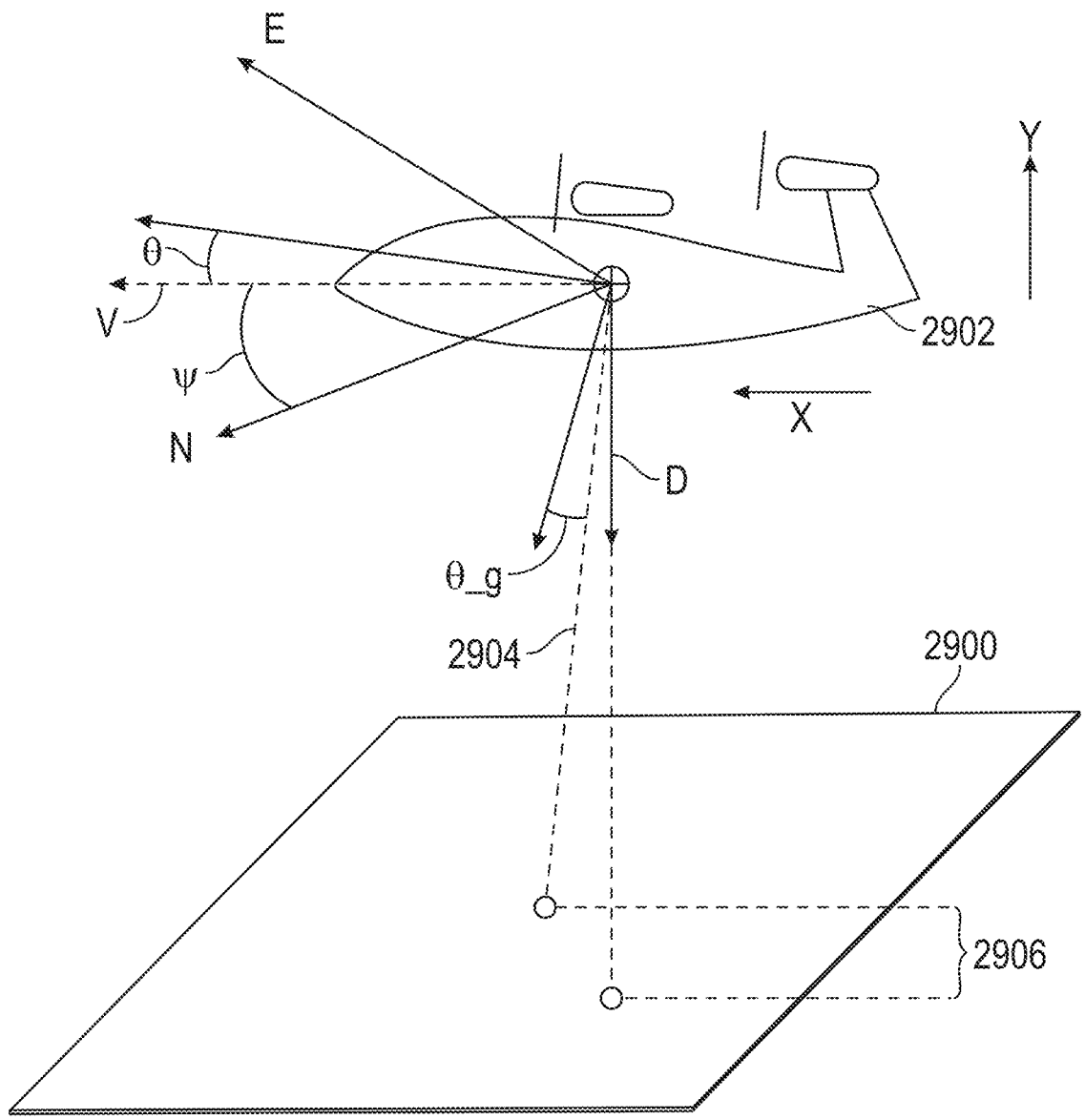
FIG. 29 is a schematic representation of an example aircraft pose in a variant of the method, according to some examples.

In an embodiment, as an example, to further illustrate the operation 210, reference will now be made to FIGS. 5 and 6A. FIG. 5 illustrates pulsed signals 500-508 that are emitted from a transmitter towards a target. For example, the pulsed signals 500-508 can be emitted from the transmitting elements 116 and the transmitter 118. During the operation 210, the pulsed signals 500-508 can reflect from a target 2900, such as terrain (FIG. 29), where reflected signals 600-608 from the target are received at one of the antenna elements 110 of an antenna 111A. In an embodiment, the reflected signals 600-608 can include an amplitude with an accompanying voltage where a high voltage associated with the reflected signal can be indicative of a highly reflective surface, which in turn creates a highly reflective signal.

Figure 6B:
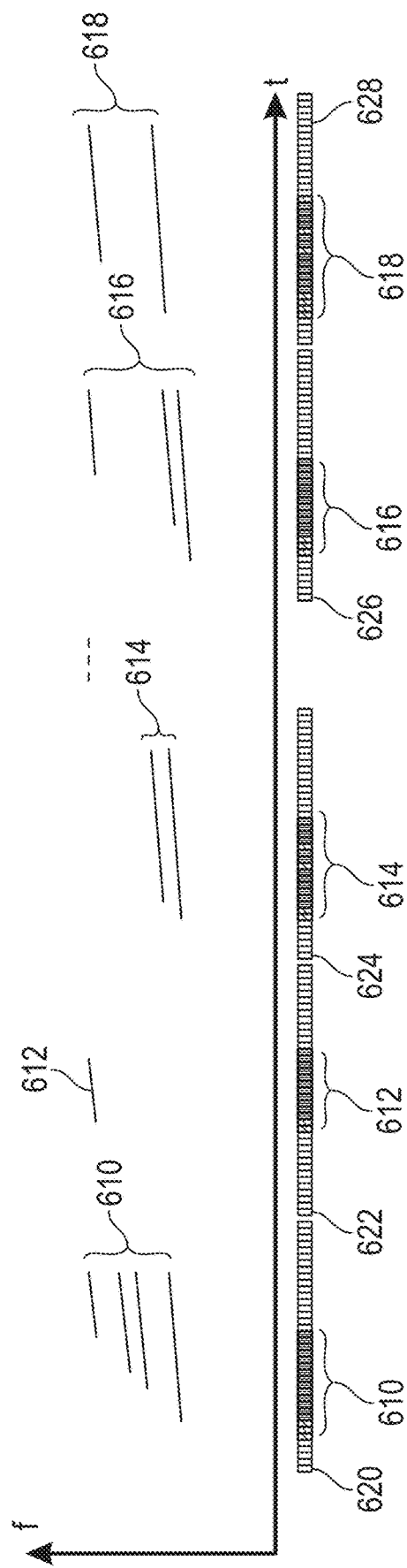
Figure 7:
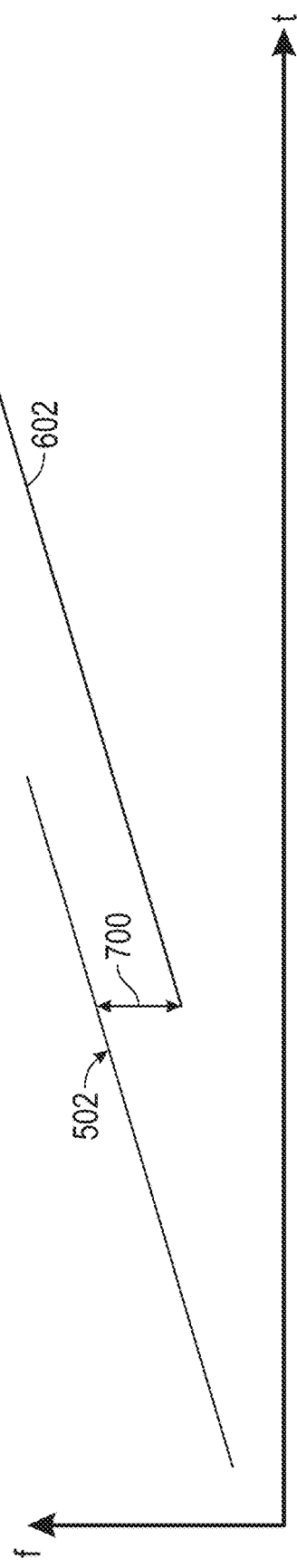
FIG. 7 illustrates the determination of a frequency difference between a transmitted signal and a received signal, according to some examples.

Returning to FIG. 2 and the method 200, the method 200 can include converting the raw data into spatial-domain data in an operation 220. In particular, in an embodiment, returning to the example discussed above with reference to the pulsed signals 500-508 and the reflected signals 600-608, in an embodiment, a frequency difference between pulsed signals 500-508 and the reflected signals 600-608 is determined. To further illustrate, making reference to FIG. 7, a frequency difference 700 between the pulsed signal 502 and the reflected signal 602 is determined. Using any suitable technique, such as stretch processing, a baseband signal can be determined from the frequency difference 700, from which ranges 610-618 (FIG. 6B) to the target, such as the target 2900, can be determined, using any suitable technique, such as range compression, which can include a FFT over fast-time samples of a baseband signal. In an embodiment, the ranges 610-618 can correlate to a distance between the antenna elements 110 and the target 2900. In embodiments, similar determinations are made between the pulsed signals 500 and 504-508 and the reflected signals 600 and 604-608.

Figure 8:
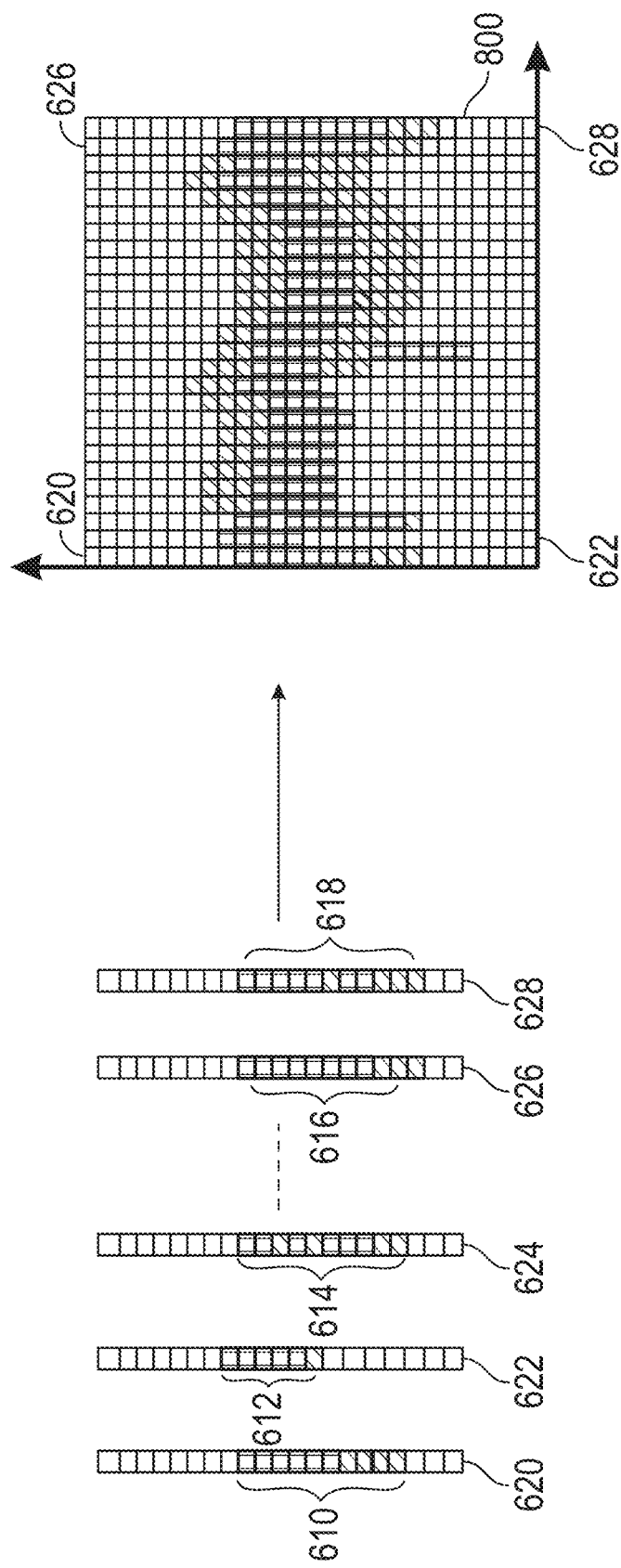
FIGS. 8 and 9 illustrate the formation of a data cube using the raw data captured with reference to FIGS. 5-6B, according to some examples.

As noted above, the ranges 610-618 are determined based on frequency differences between the pulsed signals 500-508 and the reflected signals 600-608. Each of the ranges 610-618 can be graphically represented via pulse repetition intervals 620-628 where each of the pulse repetition intervals 620-628 can be a two-dimensional representation of the ranges 610-618 over time. As may be seen with reference to FIG. 8, each of the pulse repetition intervals 620-628 can be stacked to form a graphical representation 800. The graphical representation 800 graphically represents, in a two dimensional format, the ranges determined from each of antenna element 110 of the antenna 111A.

Returning to FIG. 2, the method 200 can include determining a vehicle state estimate based on the spatial domain data during an operation 230. In the operation 230, in an embodiment, a velocity estimate (and/or other suitable vehicle state parameters) which can be used for odometry, local position determination, and/or vehicle state can be determined. To further illustrate, with the ranges 610-618, using any well-known Fourier Transform, a velocity can be determined from the ranges 610-618 represented by the graphical representation 800 during the operation 230.

Referring again to FIG. 2, the method 200 can include determining a vehicle position based on the vehicle state estimate in an operation 240. In an embodiment, during the operation 240, using any well-known Fourier Transform, a doppler can be determined from the velocities associated with the ranges 610-618 represented by the graphical representation 800.

Figure 9:
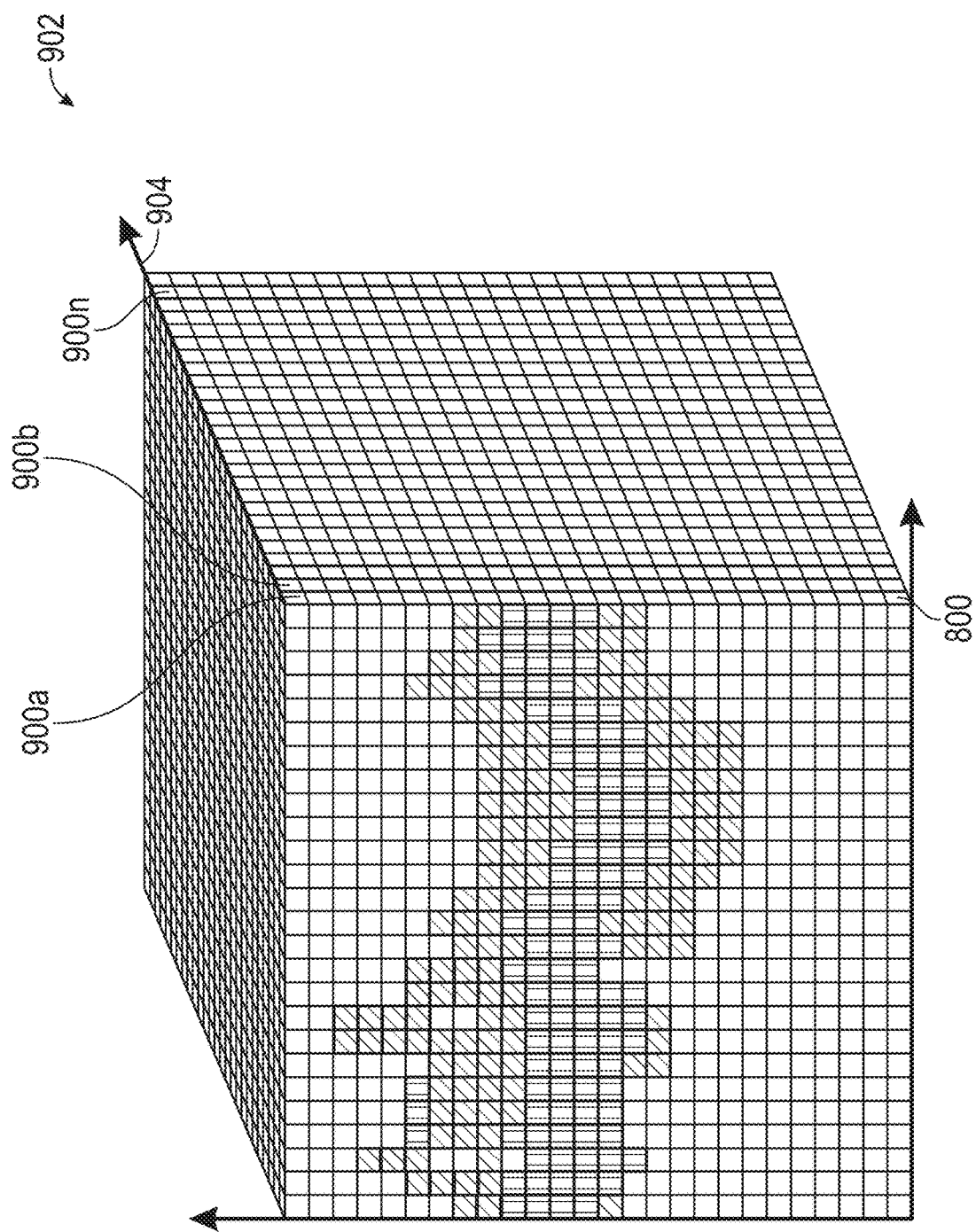

In an embodiment, the graphical representation 800 can be formed for each of the antenna 111A-111N. In particular, when the pulsed signals 500-508 are emitted from the transmitting elements 116 and the transmitter 118, in addition to the antenna elements 110 of the antenna 111A receiving reflected signals 600-608 from the target 2900, the antenna elements 110 of the antenna 111B-111N can also receive reflected signals. Graphical representations 900A-900N of the ranges can be determined from each of antenna element 110 of the antenna 111B-111N as discussed above and shown with reference to FIG. 9. In an embodiment, the graphical representations 800 and 900A-900N can be stacked to form a data cube 902 with respect to time 904, as shown with reference to FIG. 9. As noted above, using a Fourier Transform, a velocity can be determined for each of the ranges represented by the graphical representations 900A-900N during the operation 230. Therefore, using the range determinations from each of the antenna 111A-111N over time, a doppler associated with the aircraft relative to the target 2900 can be determined using the velocity determined from the ranges over the time 904 for each of the ranges in each of the graphical representations 800 and 900A-900N during the operation 240. In particular, using a Fourier Transform, a doppler can be determined for each of the velocities represented by the graphical representations 900A-900N.

Figure 10:
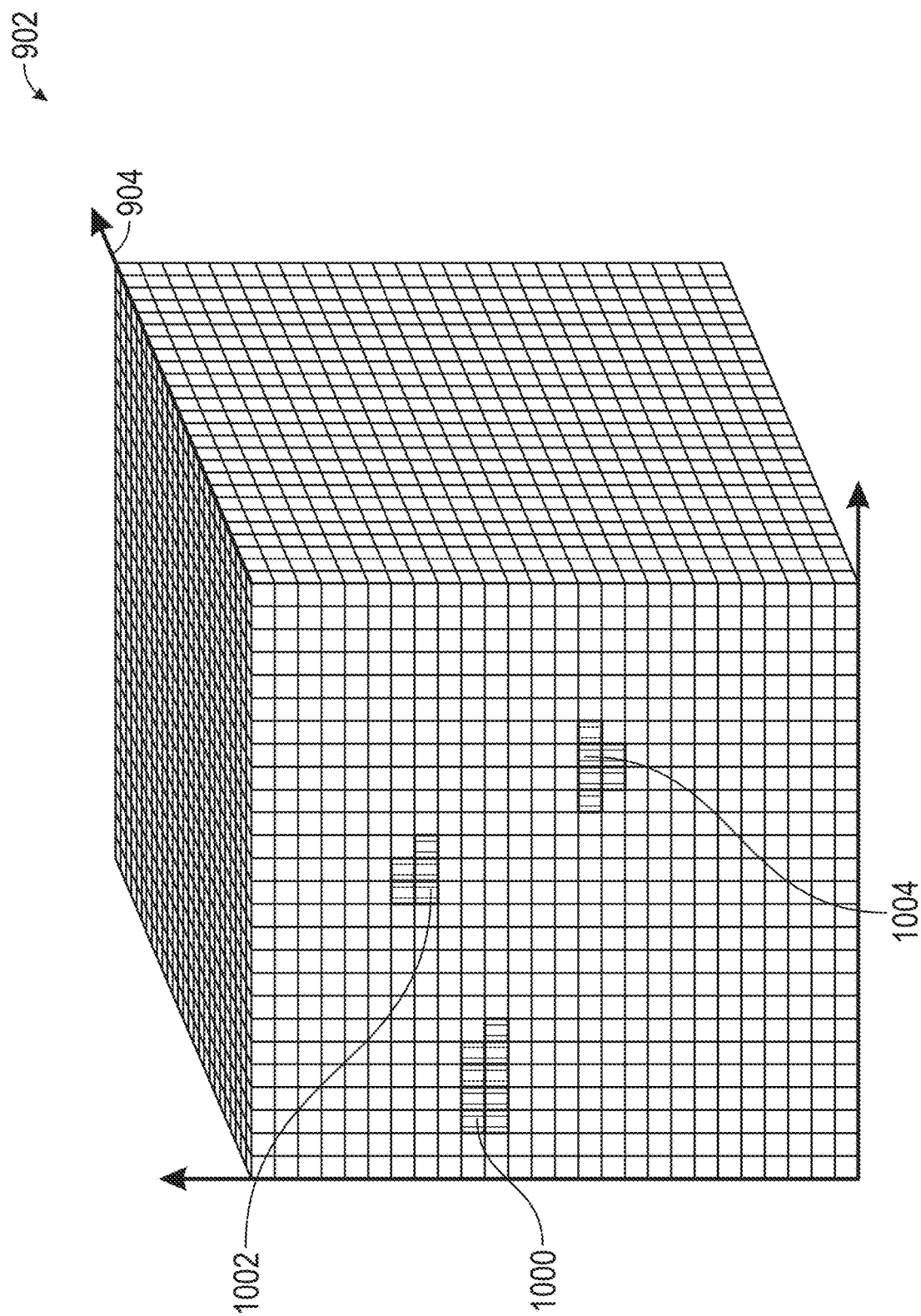
FIG. 10 illustrates a beamformed version of the data cube shown with reference FIG. 9, according to some examples.

Furthermore, beamforming can be performed on the ranges, the determined velocities, and the determined dopplers in each of the graphical representations 800 and 900A-900N. When the ranges, determined velocities, and determined dopplers are beamformed, the cube 902 can be formed such that voxels 1000-1004 are formed, as shown with reference to FIG. 10. In an embodiment, the voxels 1000-1004 can correlate to a 3D pixel within the cube 902. Moreover, each of the voxels 1000-1004 can correspond to a position of the vehicle in azimuthal and elevational directions. In an embodiment, the beamformed data can be used to determine an angle between the vehicle having the system 100 and the target 2900 such that the ranges are used to determine the angle. Furthermore, the determined ranges, velocities, dopplers, and angles can be used to determine a position of the vehicle in the operation 240.

In another embodiment, during the operation 220, range, doppler, and spatial parameters (e.g., wave numbers, azimuth+elevation) can be extracted from the data cube 902. The set of range, doppler, and wave number values from a single coherent processing interval ('frame' or 'image') can be referred to as the data cube 902. The spatial parameters of the spatial-domain data can be provided as wave numbers (or "spatial frequency", such as angular wave numbers Kx and Ky (corresponding to an azimuthal angle and an elevation angle of the receive element), azimuth/elevation angles, and/or in any other suitable format in the spatial domain. In variants, angular wave numbers Kx and Ky can be taken as the projection of a raw 3D direction vector (such as $\vec{k}$ in FIG. 31) into the sensor array plane. In variants, Kx can be oriented along, associated with, aligned with, or vary along the longitudinal axis X (FIG. 29) of the aircraft, and Ky can be oriented along or associated with, aligned with, or vary along the lateral axis Y (FIG. 29) of the aircraft. Alternately, Kx can be associated with the lateral axis Y and Ky can be associated with the longitudinal axis X (e.g., such as for an orthogonally mounted antenna array, based on an orientation of the radar system, and/or otherwise based on a notational difference), or otherwise associated with the aircraft axes.

In a specific example, for small angle approximations around zero azimuth and elevation: Kx~=sin(azimuth) and Ky~=sin(elevation).

In a second specific example, when taking the FFT of a uniformly spaced array (e.g., wavelength (*λ)/2 spaced array) the angular wave numbers Kx and Ky can be simplified such that indices [1, N] are mapped to an interval of [−1, 1].

In addition to the data cube 902 discussed above with reference to FIG. 9, spatial domain data such as a data cube 1100 (FIG. 11) can be generated by a 3D FFT transformation of the raw data where the data cube 1100 can be beamformed to generate a data cube 1102 having a voxel 1104 where a value of each voxel 1104 represents the echo amplitude (or intensity) associated with the range, doppler, and wavenumber(s) (e.g., Kx, and Ky), as shown with reference to FIGS. 11-27. With reference to FIGS. 12-27, FIGS. 12-15 and 20-23 represent data slices collected at a simulated velocity of [5,0,0] while FIGS. 16-19 represent data slices collected at a simulated velocity of [0,0,5], and FIGS. 24-27 represent data slices collected at a simulated velocity of [0, 5, 0]. Regarding the data cube 1100, this can include a slow time axis 1106, a spatial axis 1108, and a fast time axis 1110. The data cube 1102 can include a doppler axis 1112, a wavenumber axis 1114, which can alternatively be azimuth plus wavelength, and a range axis 1116. In embodiments, FIGS. 12-27 relate to slices of the data cube 902 for a single antenna of the antennas 111A-111N Moreover, in FIGS. 12-27, the intensity can relate to return power, a magnitude of a signal, or can a reflected signal given a transmitted power. Additionally, the maximum intensity doppler bin can relate to a bin in a data cube having the highest intensity of voxels therein.

In variants, sidelobes in one or more dimensions (or each dimension) can cause the measured power in each voxel to be a weighted contribution from nearby (adjacent) voxels of an ideal data cube.

The result of this transformation can be provided in any suitable data format or "image." In a first variant, the result is a 4D data cube with each pixel indexed by range (or "range bin" spanning a predetermined/dynamically set of range values), range rate (or "doppler bin" spanning a predetermined/dynamically set of range rate values) and wavenumbers: Kx and Ky, and each pixel maps to an associated intensity. The collection of 4D pixels (or 4D voxels) corresponding to an individual bin in a given dimension (e.g., range bin of 30) can be accordingly described as a 3-dimensional 'slice' of the data cube. Additionally or alternately, this data cube can be reduced in one or more dimensions or consider only a portion of available data for one or more subsequent method processes (e.g., include data for a single range bin, doppler bin). In variants, the image can be time indexed and/or time stamped to include an additional time dimension (e.g., 5D data cube). In a specific example, the short time interval is on the order of MHz, the long time interval is on the order of kHz, and thus temporal changes (e.g., resulting from ego-motion, terrain change) can be observable in the spatial domain on the order of: kHz, 100 Hz, 10 Hz, Hz, and/or with any other suitable timing. In particular, providing an additional time dimension can be useful when employed in conjunction with synthetic-aperture radar (SAR) techniques. Employing SAR processes can help resolve returns with few incident angle returns, such as might occur during flight over still water.

The data cube can be segmented into any suitable number of bins in any suitable dimensions. In a specific example, range is segmented into 128 bins. In a second specific example, range rate is segmented into 128 range rate (doppler) bins. In an alternate example (e.g., to reduce data), there can be a single pulse per coherent processing interval (aka frame), and range rate can be inferred across multiple frames. In a third example, there can be 8 Kx bins and 4 Ky bins.

In variants, the frame can be divided into a first number of Kx and Ky bins, and a second (greater) number of Kx and Ky bins can be generated by interpolating between the Kx and Ky bins (which can increase the frame resolution along the waveform axes). In a first example: the Kx and Ky bins can be interpolated to generate 8 Kx and 8 Ky bins. In a second example, the Kx and Ky bins can be interpolated to generate 64 Kx and 64 Ky bins (e.g., as shown in FIGS. 12-15). However, the raw data can be otherwise suitably converted into spatial-domain data and/or data can be transformed into any other suitable format.

As noted above, the method 200 can include determining a vehicle state estimate based on spatial domain data during the operation 230. In another embodiment, a velocity estimate can be provided (and/or other suitable vehicle state parameters), which can be used for odometry, local position determination, and/or vehicle state determination in the operation 230. The velocity estimate can alternatively be used to improve the efficiency of indirect methods of image processing.

Figure 28:
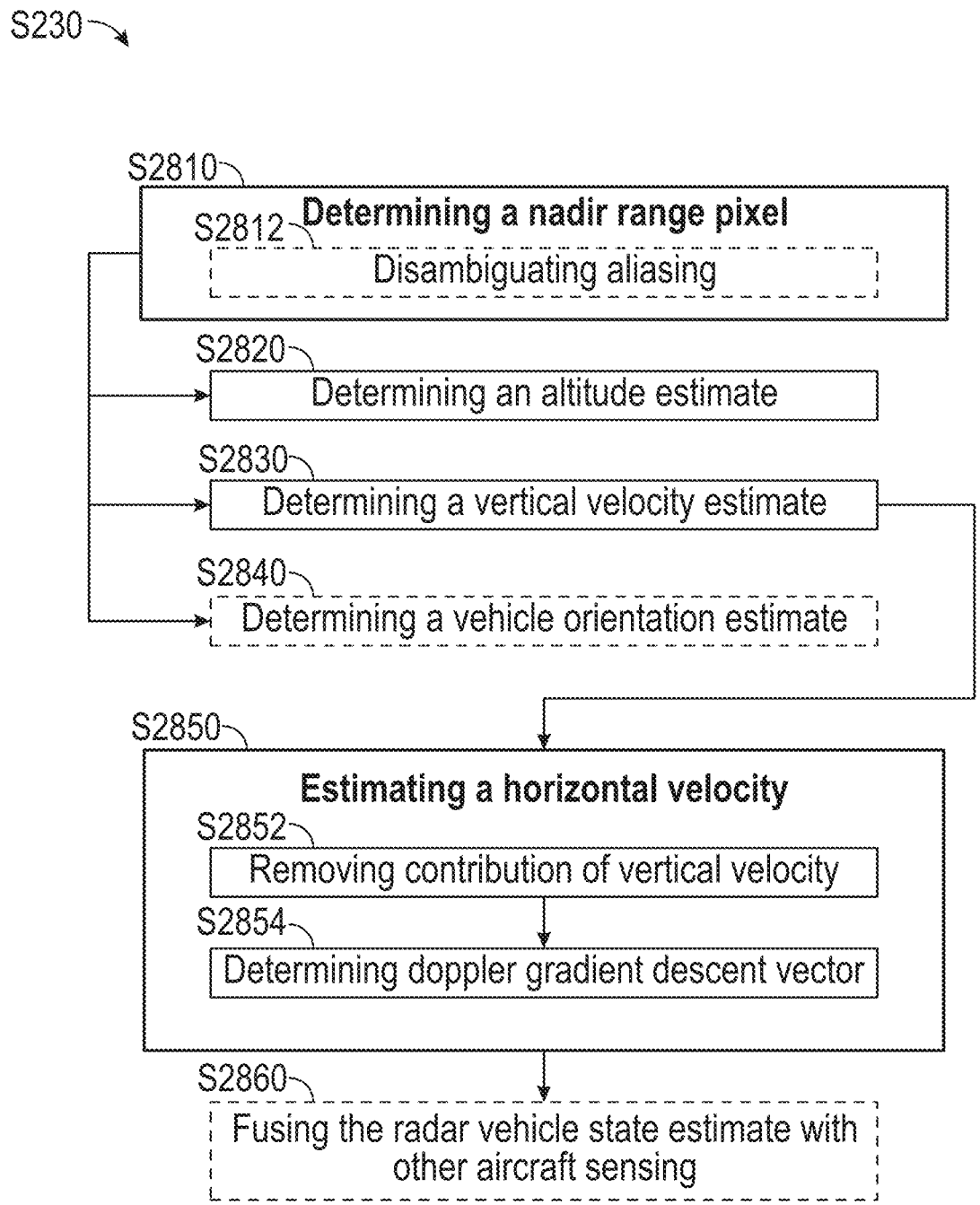
FIG. 28 is a diagrammatic representation of an example of determining a vehicle state estimate based on the spatial domain data in a variant of the method, according to some examples.

Furthermore, as shown with reference to FIG. 28, in this embodiment, the operation 230 can include: an operation 2810 where a nadir range feature, such as a nadir range pixel 1200, is determined and an operation 2812 where an altitude estimate is determined based on the nadir range pixel determined in the operation 2820. In an embodiment, the nadir range pixel can correspond to the strongest reflection signal from the target 2900. Thus, of the reflected signals 600-608, the nadir range pixel 1200 can correspond to the strongest reflected signal of the reflected signals 600-608. In an embodiment, the strongest reflected signal can correspond to a reflected signal of the reflected signals 600-608 having the smallest frequency difference between the frequency associated with the transmitted signal and the frequency associated the reflected signal. In an embodiment, the strongest reflected signal can correspond to a reflected signal of the reflected signals 600-608 having the greatest power associated therewith. Moreover, range 1202 can correspond to the reflecting signal weakening, i.e., the reflection is not as strong as the reflection associated with the nadir range pixel 1200. Additionally, range 1204 can correspond to the reflecting signal strengthening to the strongest reflected signal (i.e., the nadir range pixel 1200). In this embodiment, the operation 230 can include determining a vertical velocity estimate based on the nadir range pixel in an operation 2830 and determining a horizontal velocity estimate during in an operation 2850. In this embodiment, the operation 230 can also optionally include determining a vehicle orientation estimate during an operation 2840 and fusing the radar vehicle state estimate with other aircraft sensing during an operation 2860.

In an embodiment, determining a nadir range feature in the operation 2810 can function to determine a data cube pixel corresponding to height above ground level. The nadir range feature can be a nadir range pixel, a nadir range band, or any other suitable portion of the data.

Figure 16:
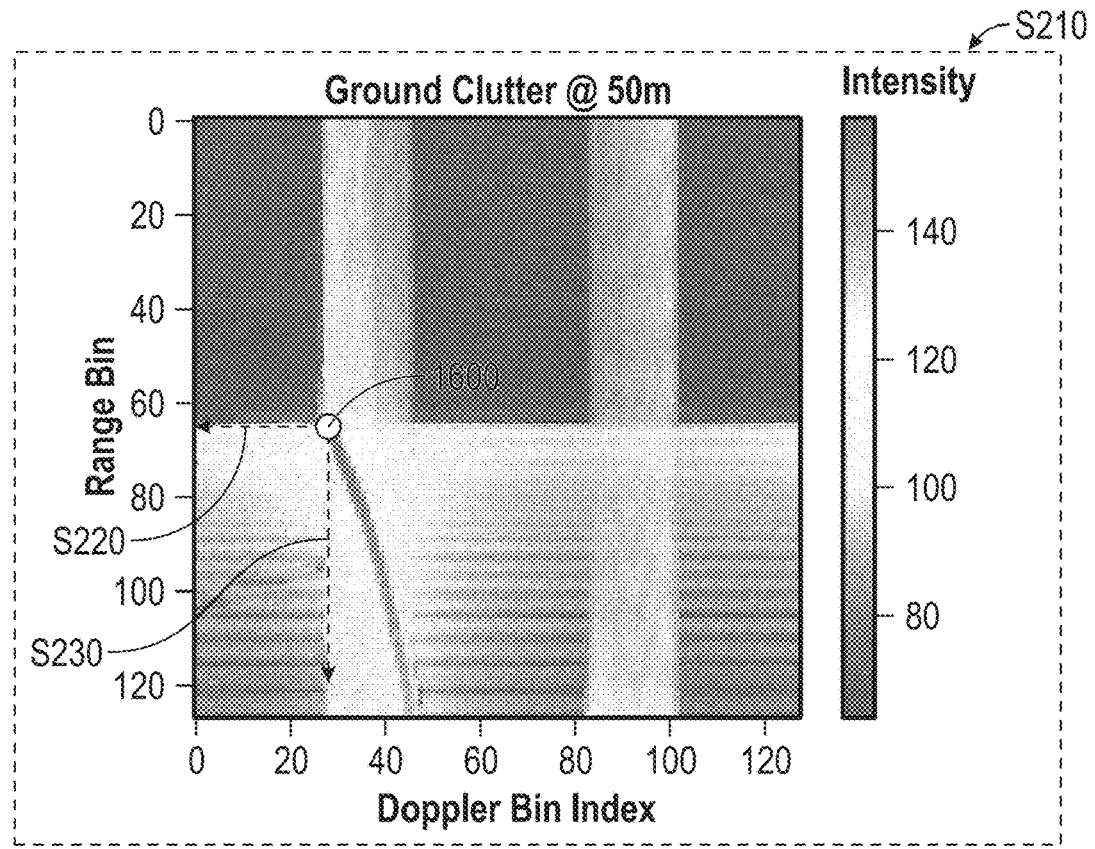
FIGS. 16-19 illustrate simulated data cubes processed in a variant of the method, according to some examples.
Figure 17:
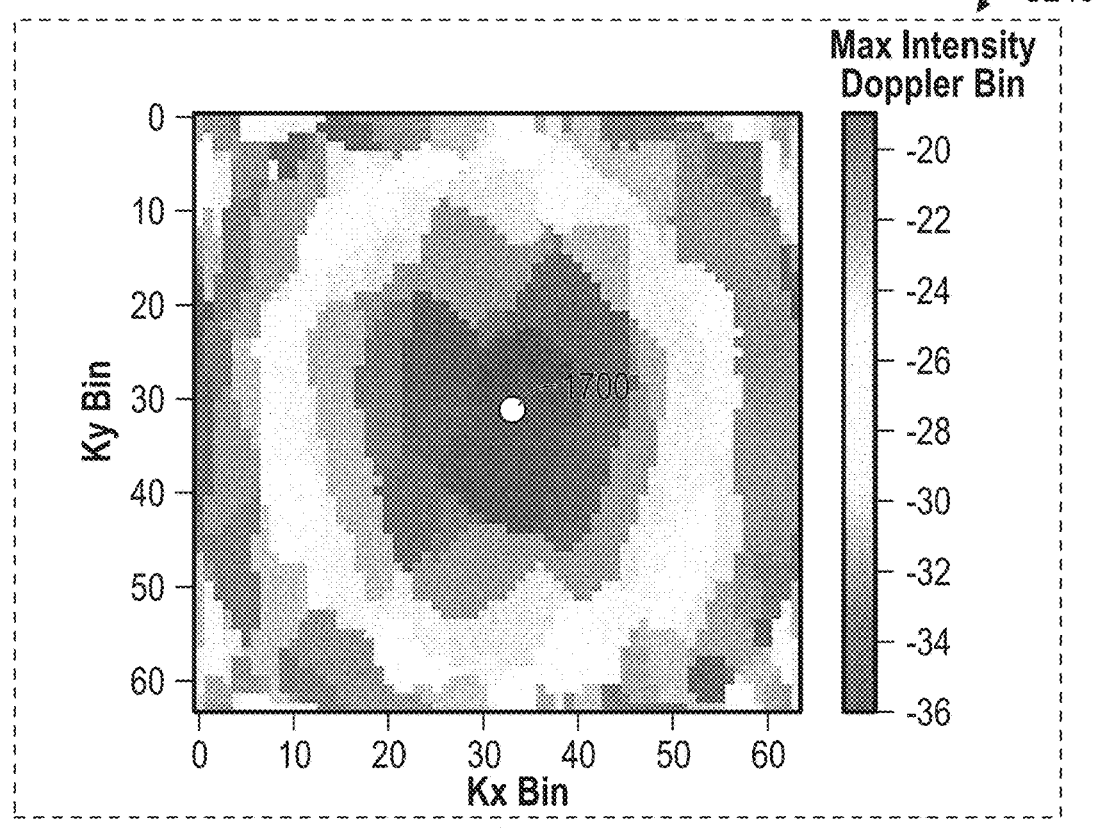
Figure 18:
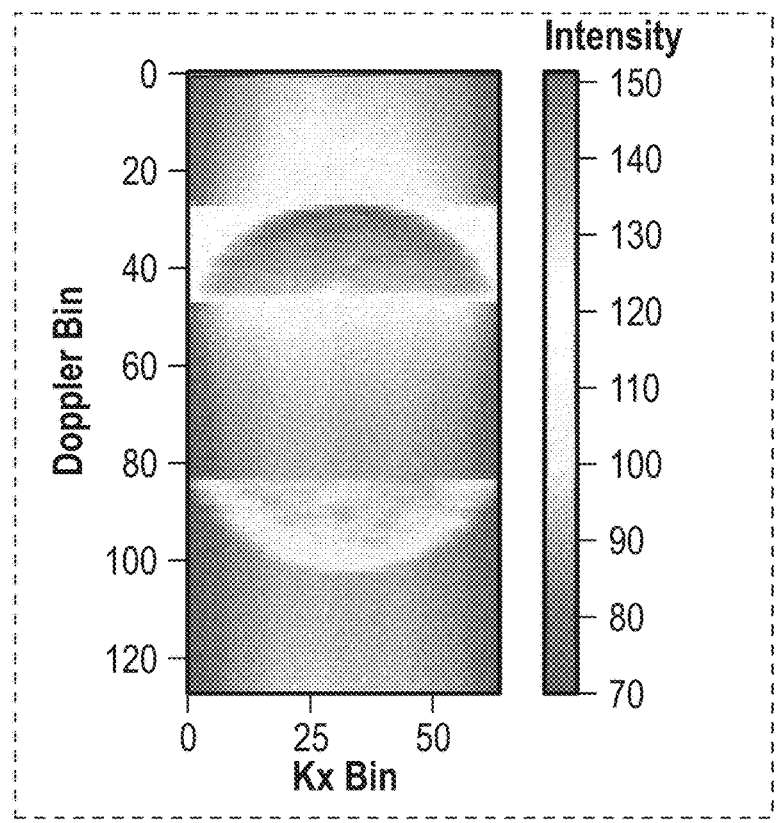
Figure 19:
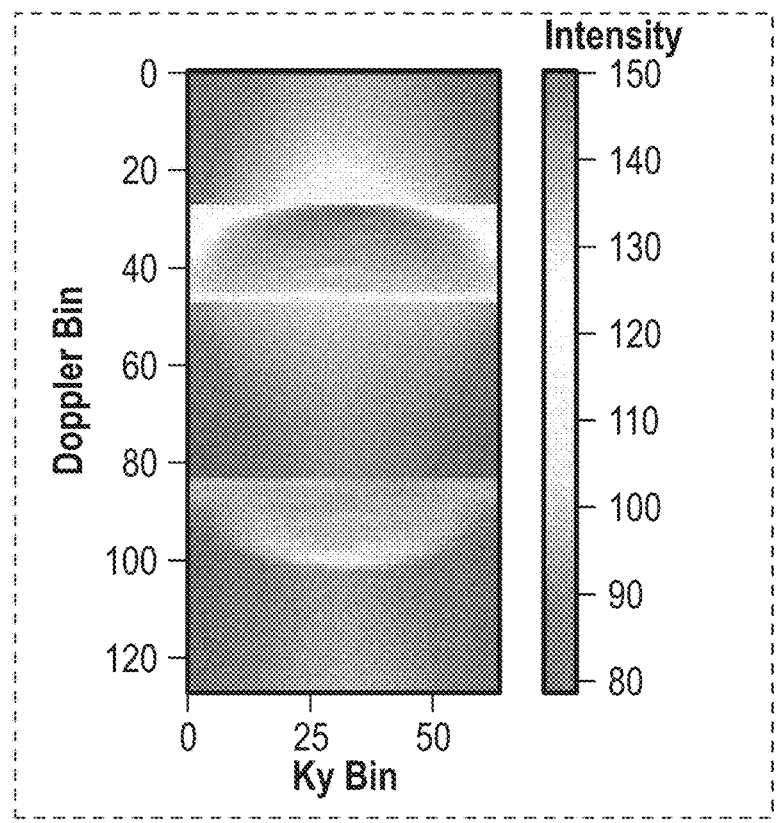
Figure 20:
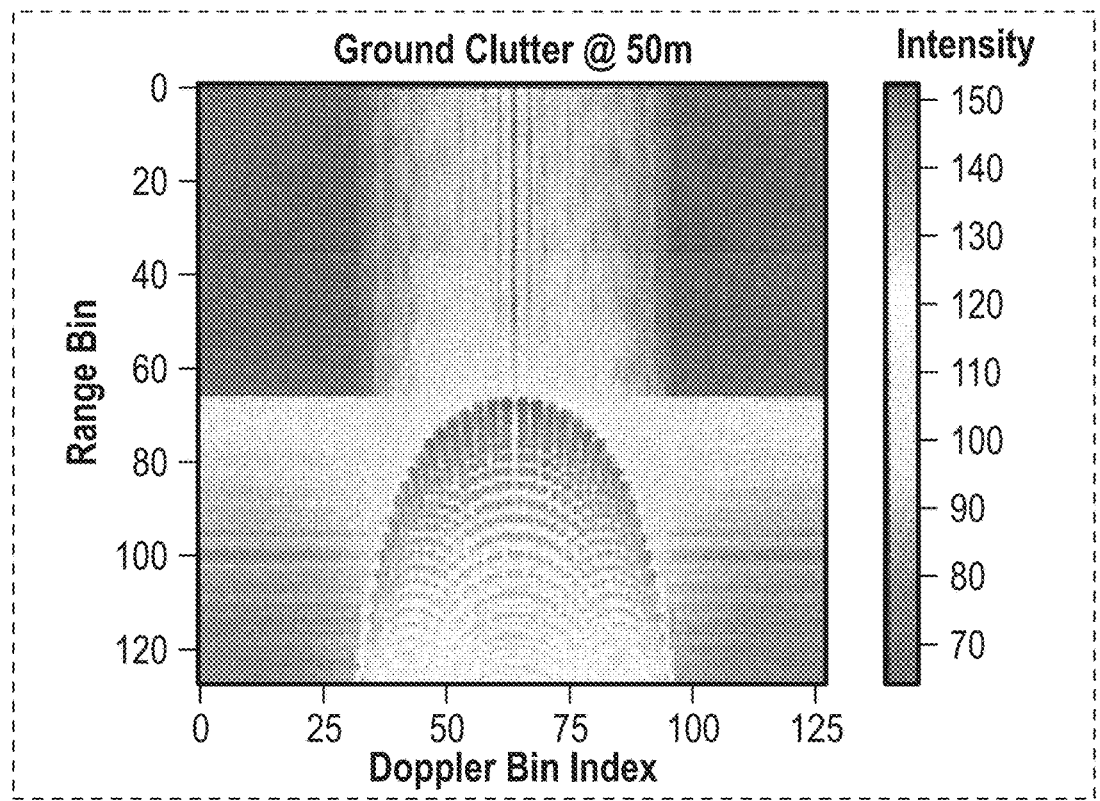
FIGS. 20-23 illustrate simulated data cubes processed in a variant of the method, according to some examples.
Figure 21:
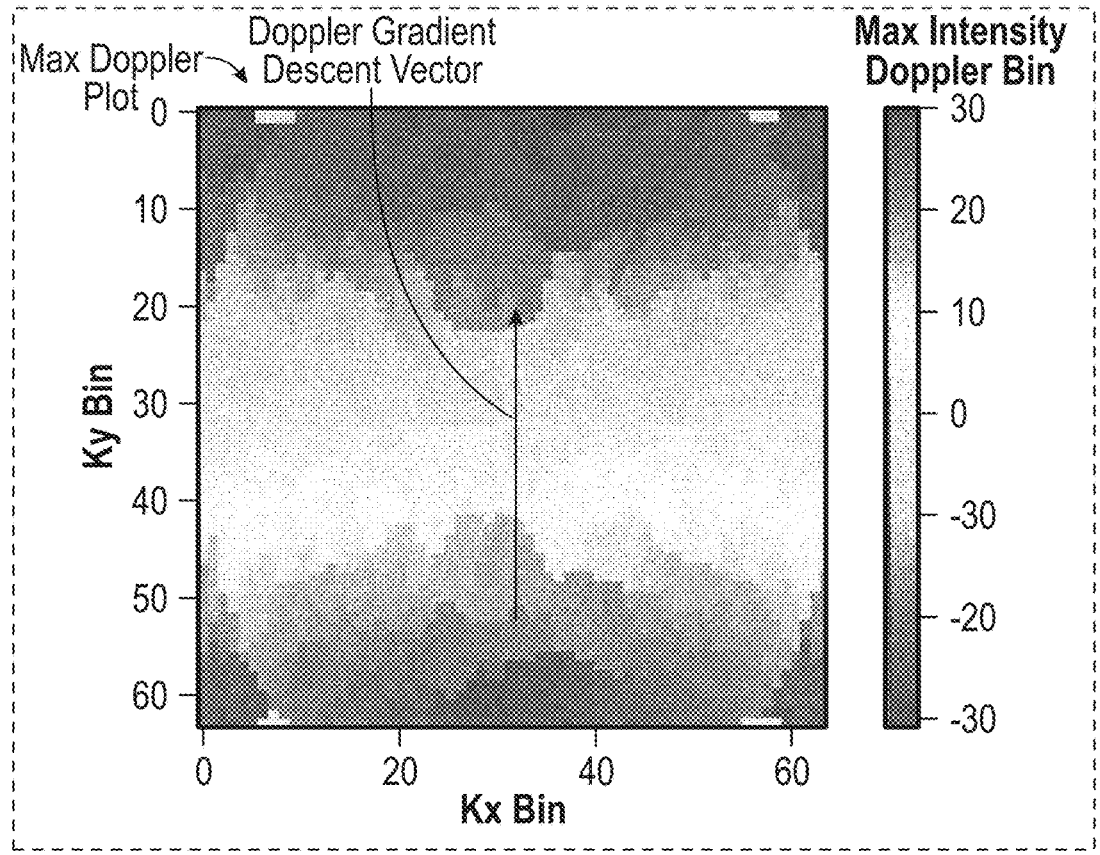
Figure 22:
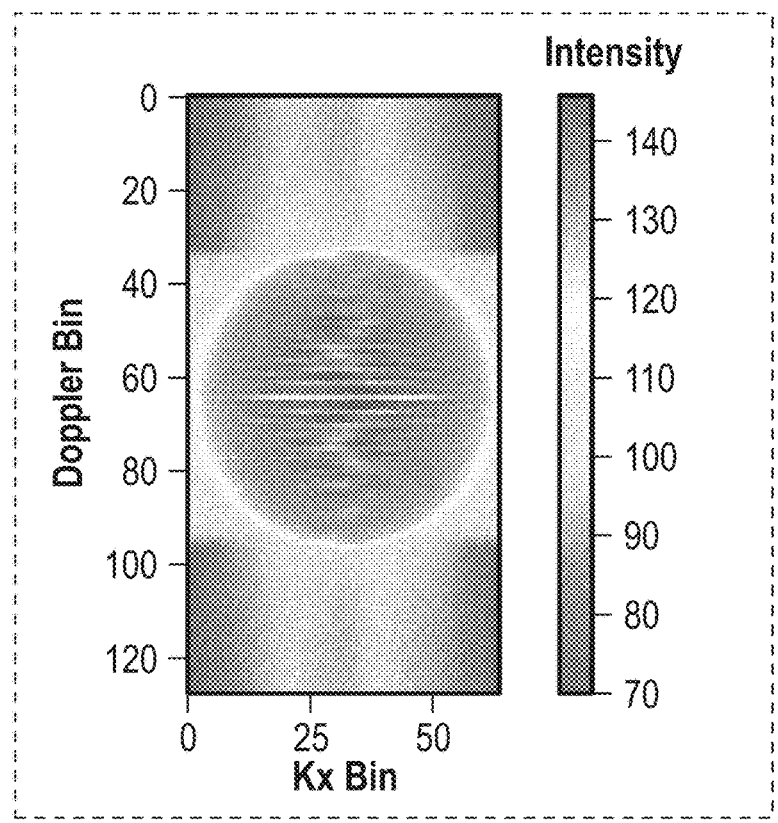
Figure 23:
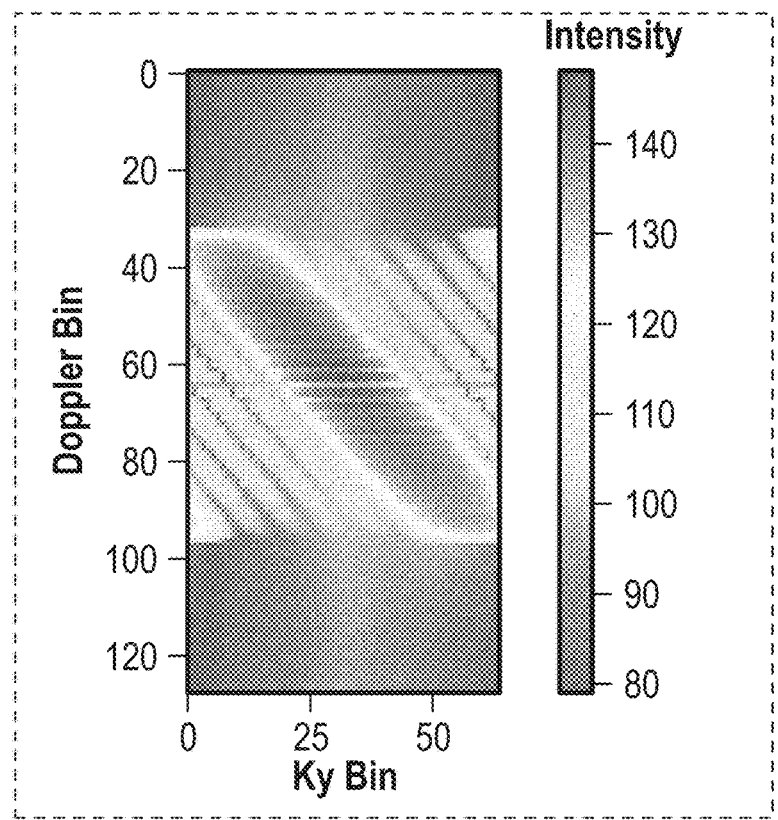
Figure 24:
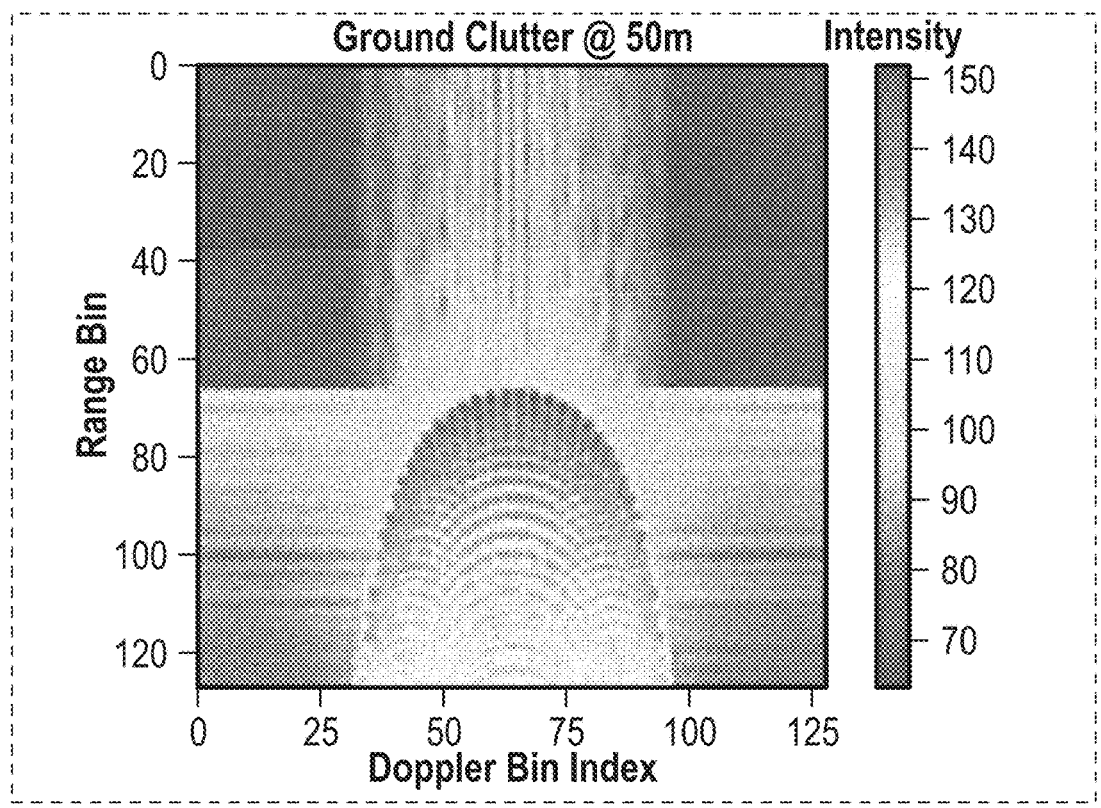
FIGS. 24-27 show simulated data cubes processed in a variant of the method, according to some examples.
Figure 25:
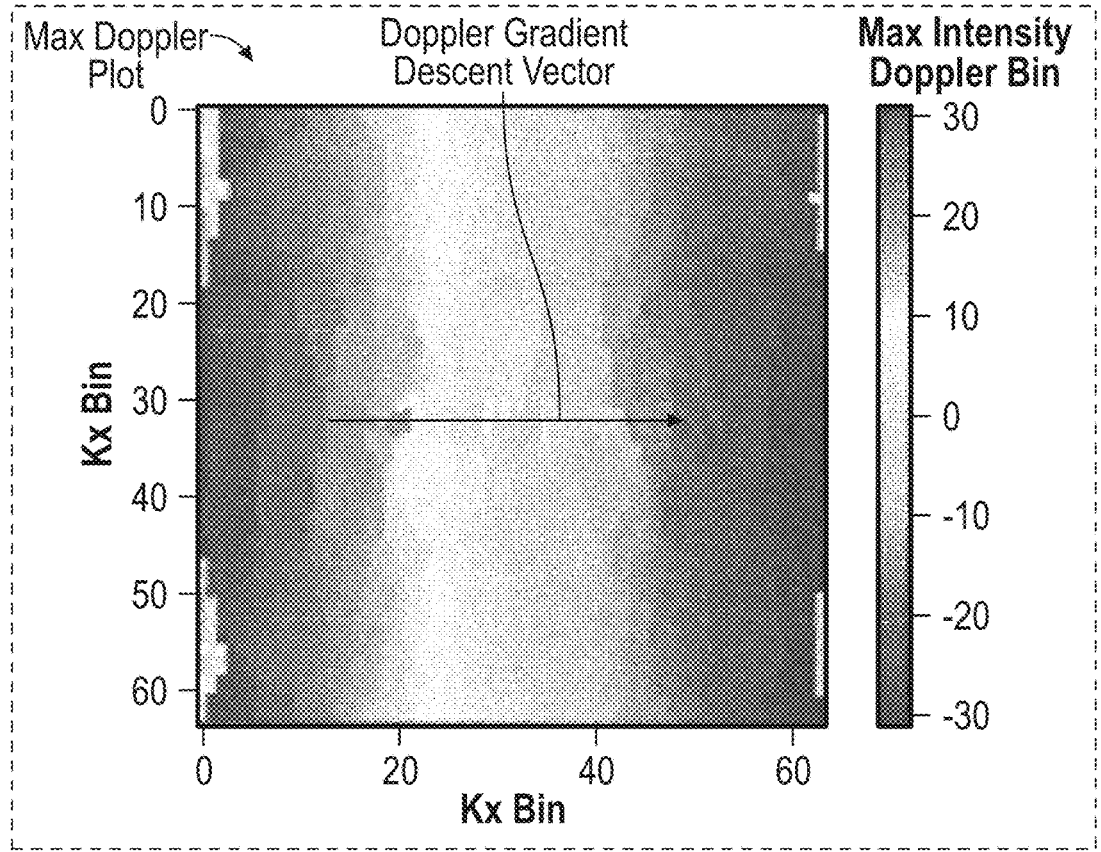
Figure 26:
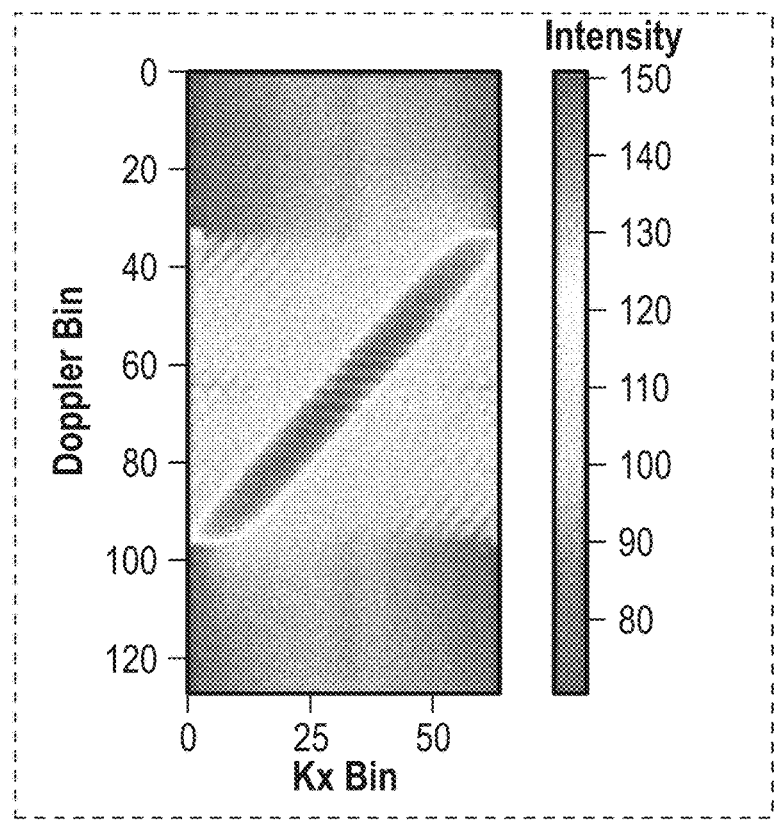
Figure 27:
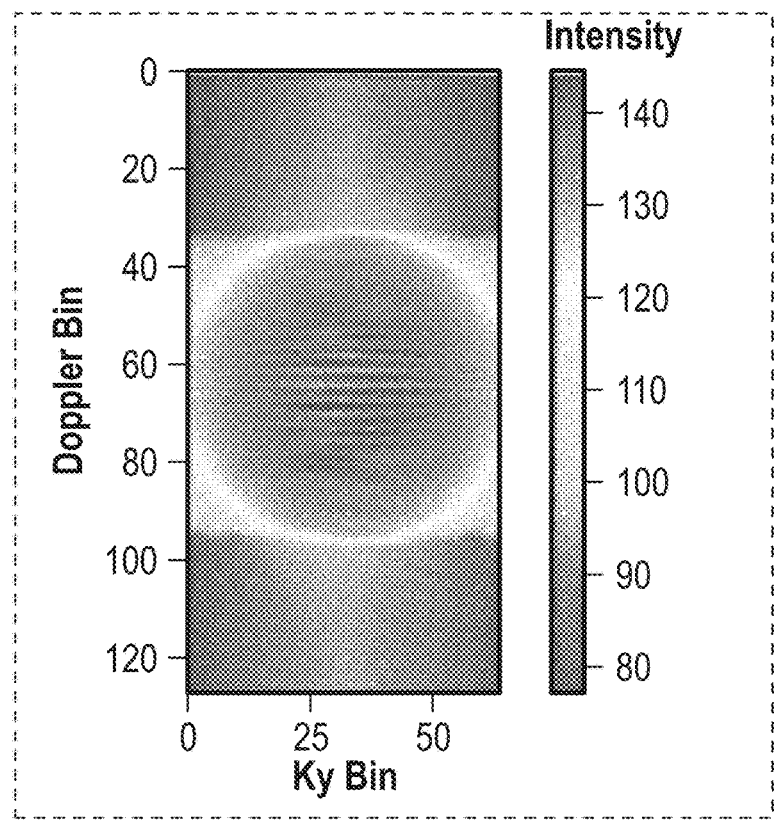

In a first variant, the nadir range feature is a nadir range pixel, such as the nadir range pixel 1200, 1600 (FIG. 16), or 1700 (FIG. 17). In embodiments, the nadir range pixels 1600 can have characteristics similar to the nadir range pixel 1200. The nadir range pixel 1200, 1600, or 1700 can be aligned with the aircraft in the vertical direction, can be at an angle relative to the vertical direction (downward direction, D) due to the local terrain gradient and/or deviations in the radar measurement, or be otherwise arranged relative to the vehicle. An example of the nadir range relative to the downward direction is shown in FIG. 16.

A first variant can include generating a 2D intensity graph (with axes doppler and range), where each pixel is taken as the sum of all intensities of the Kx-Ky slice (e.g., within the doppler/range pixel), and selecting the nadir pixel within the 2D intensity graph, as: the pixel with the lowest range value with an intensity above a threshold intensity (e.g., predetermined, dynamically determined, within a % deviation of the max intensity), max intensity pixel, pixel with highest intensity gradient change, and/or otherwise selecting the nadir pixel.

In a second variant, the nadir range feature is a nadir range band, where the nadir range pixel can be determined from the nadir range band. The nadir range band can be identified as: the range bin with the highest gradient change in intensity, return power in the range-time slice, the range-doppler slice, or ground clutter plot (e.g., fastest average or mean gradient drop off); as the range bin including the pixel with the highest intensity or return power (e.g., from denoised data); or otherwise identified. The nadir range can be the range of the range bin and the nadir range pixel can correspond to the range with the highest gradient change intensity, return power in the range-time slice, the range-doppler slice, or ground clutter plot.

In a third variant, determining the nadir range feature includes determining the nadir range band (e.g., as discussed in the second variant), then determining a nadir range pixel from the nadir range band (e.g., as discussed in the first variant). However, the nadir range can be otherwise determined.

In an embodiment, the operation 2810 can optionally include disambiguating aliasing 812, which functions to ensure that the identified nadir pixel corresponds to a real detection of the ground (e.g., neglect aliasing, expand observable range). In variants, there can exist a tradeoff between unambiguous Doppler and range swath in the radar waveform design. The pulse repetition frequency (PRF) sets both the max range and Doppler of the design, which can be inversely related: MaxRange=c/(PRF/2); and DopplerSwath=PRF*wavelength/2.

For Doppler, this can be viewed as a standard Nyquist aliasing limitation. For Range, the limitation results from the reflections from pulse M mixing with the transmitted pulse M+1. This can provide a limitation for the Doppler and Range swaths processed during the operation 2810. For example, at 33 GHz, to get a Doppler swath of 200 m/s, range is limited to 3400 m. For TRN applications, pulse processing can leverage the fact that returned signal energy is not expected until the nadir range (e.g., such as from a previous AGL measurement, previous state estimate, other altitude sensing, etc.) and can adjust the PRF to place the range ambiguity at or near the significant ranges (proximal the nadir): MaxRange=c/PRF. Variants (e.g., due to waveform design constraints) can additionally or alternately employ the Nth ambiguity (reflection from pulse M mixes with transmitted pulse M+N), such that: MaxRange ($r_{max}$) is defined as shown below:

$$r_{max} = \frac{f_{max} c t_c}{2 \Delta B}$$

In the above, $f_{max}$ is the max sample rate, c is the speed of light Delta-B is the bandwidth, $t_c$ is the chirp duration.

Such variants can verify low returned energy in the first N pulses to confirm that there are no reflections at shorter ranges. However, variants can otherwise disambiguate aliasing.

The nadir pixel can also be otherwise determined.

Figure 11:
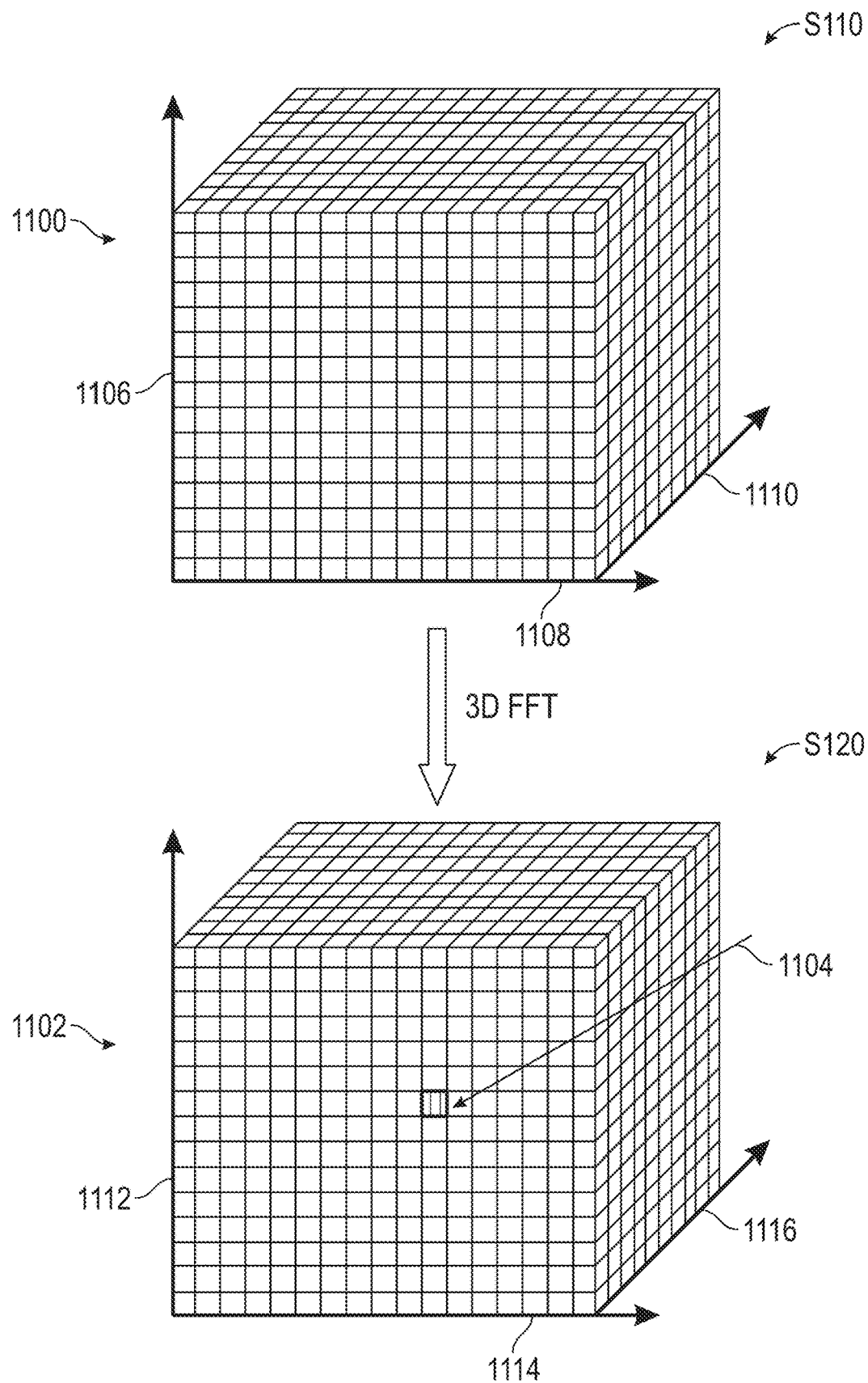
FIG. 11 is a diagrammatic representation of an example of a portion of the method, according to some examples.
Figure 12:
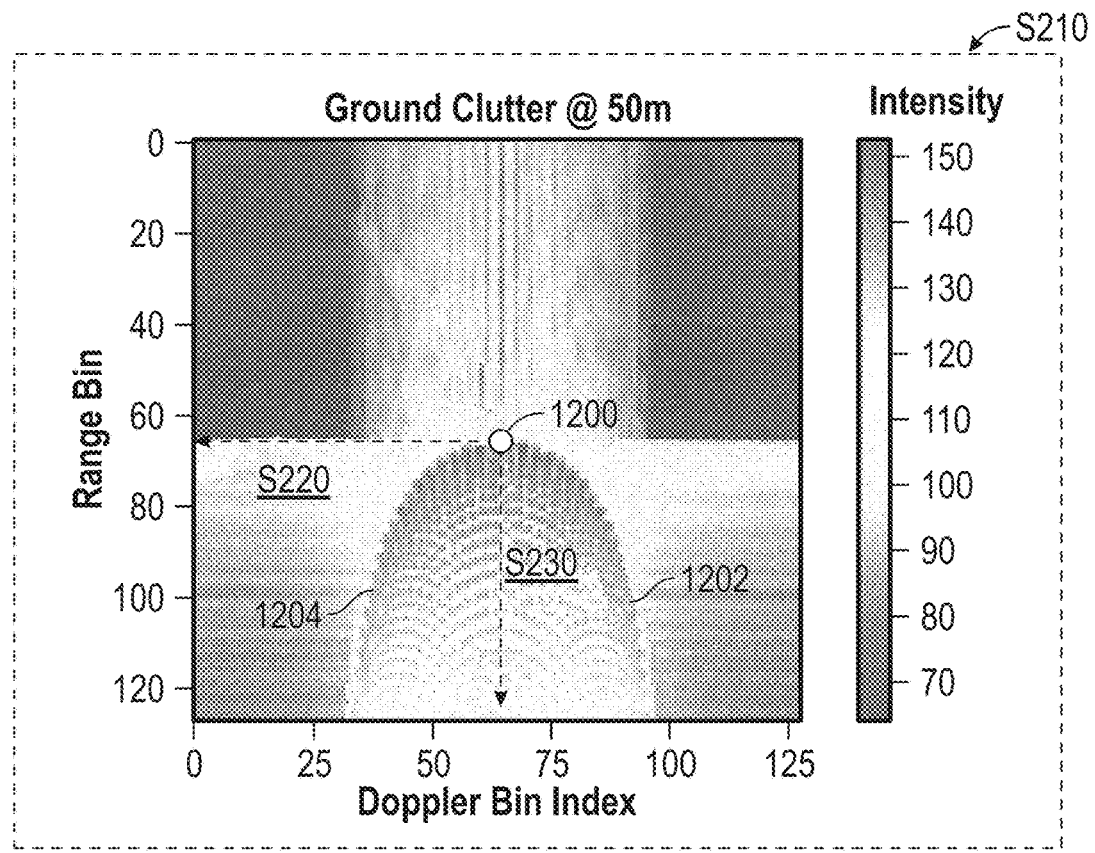
FIGS. 12-15 illustrate simulated data cubes processed in a variant of the method, according to some examples.
Figure 13:
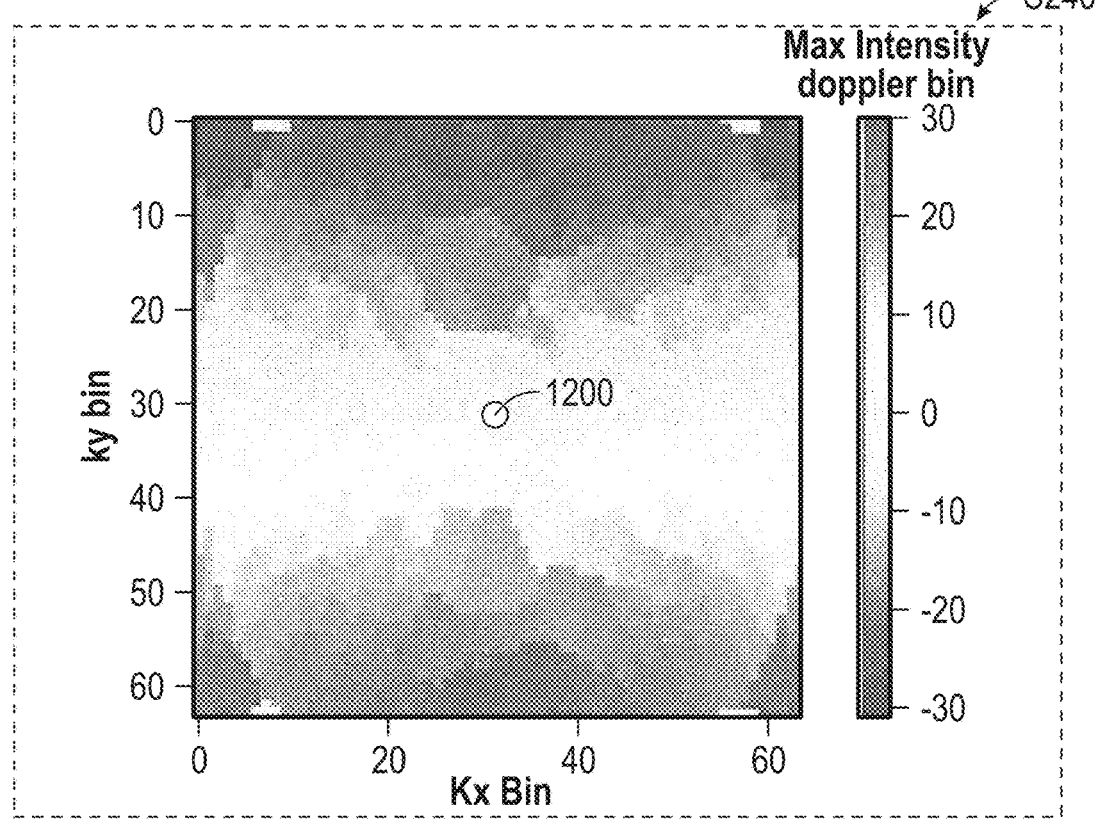
Figure 14:
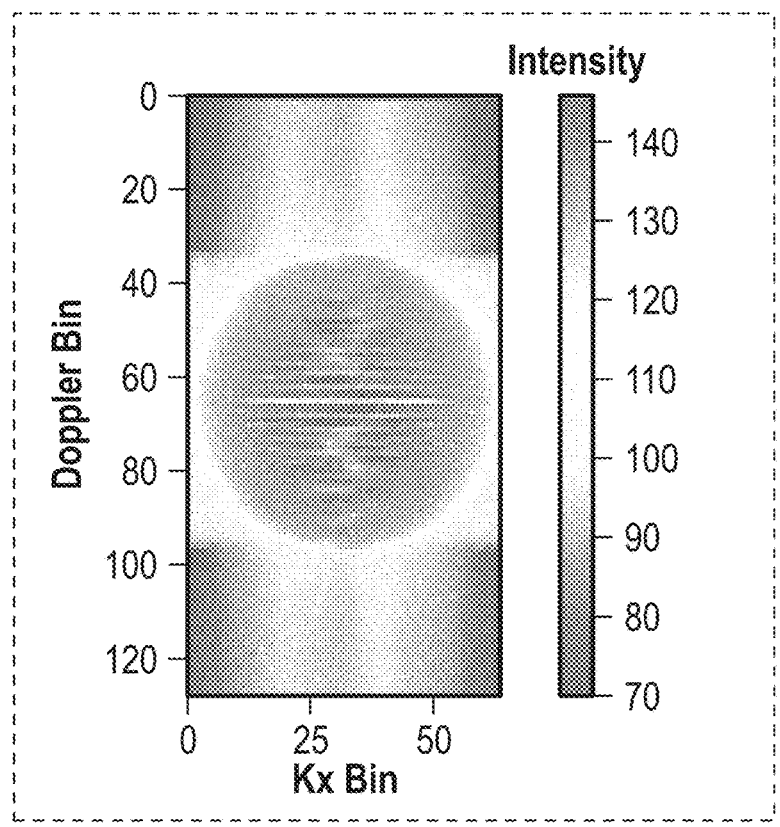
Figure 15:
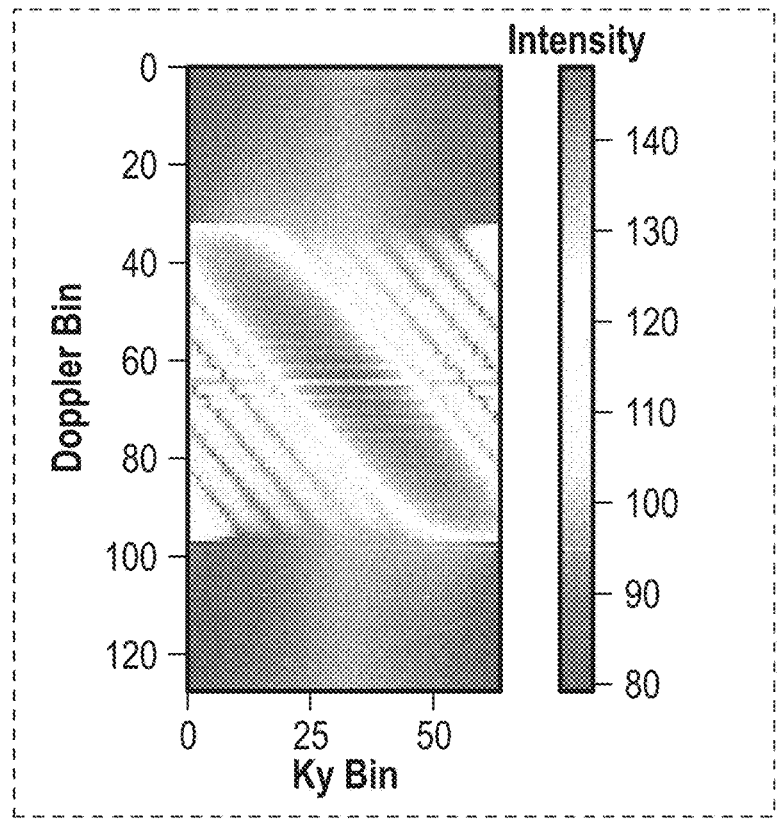

In further embodiments, the operation S130 can include determining an altitude estimate (e.g., above ground level) during the operation 2820. In particular, the altitude estimate can function to provide an altitude as one of the estimated vehicle state parameters to aid in aircraft navigation, guidance, and control. In an embodiment, the strongest reflected signal of the reflected signals 600-608 from the target 2900 can be used to determine a height of a vehicle 2902 from the target 2900, which can be a nadir range 2904, that can correlate to a height above the target 2900, as shown with reference to FIG. 29. In an embodiment, the nadir range 2904 can take into account a terrain elevation 2906 that can be associated with a distance D, which can differ from the nadir range 2904. In a first variant, during the operation 2820, the range of the nadir range 2904 of the nadir range feature (e.g., nadir range pixel can be directly taken as an altitude estimate (examples are shown in FIG. 11 (voxel 1104) and FIGS. 12-15). In a second variant, the range of nadir range pixel can be fused with other AGL sensors and/or verified/validated against other AGL sensors (e.g., in the operation 2860). In a third variant, a height above mean sea level based on height above ground level and terrain gradient estimate can be determined in the operation 2820. However, the altitude estimate can be otherwise suitably determined.

In a further embodiment, the operation 230 can include determining a vertical velocity estimate in the operation 2830, which functions to allow for removal of the vertical velocity component from a range rate in order to estimate horizontal velocity. In an embodiment, the vertical velocity can be determined in the operation 2830 from the nadir range 2904. Alternately, determining a vertical velocity estimate can function to provide a vertical velocity as one of the estimated vehicle state parameters to aid in aircraft navigation, guidance, and control.

In a first variant, the doppler (range rate) of the nadir range feature (e.g., nadir range pixel) can be directly provided as the vertical velocity estimate. In a specific example, the first variant can be employed when multiple doppler bins are available. In variants, a coherency assumption can be leveraged (e.g., that the scattered reflection has linear phase over the frame) in the operation 2830, including when more than a predetermined number of coherent ground scatterer targets are available. In a second variant, if only one pulse per coherent processing interval is used, a range rate can be inferred from the rate of change in range (e.g., of nadir pixel, of particular features, etc.) over multiple frames (e.g., over sequential frames, using optical flow techniques) in the operation 2830. In a third variant, the vertical velocity estimate can be fused with a velocity measurement determined based on inertial navigation sensors (INS) and/or verified/validated against other inertial navigation sensors, such as in the operation 2860. However, the vertical velocity can be otherwise suitably determined.

Figure 31:
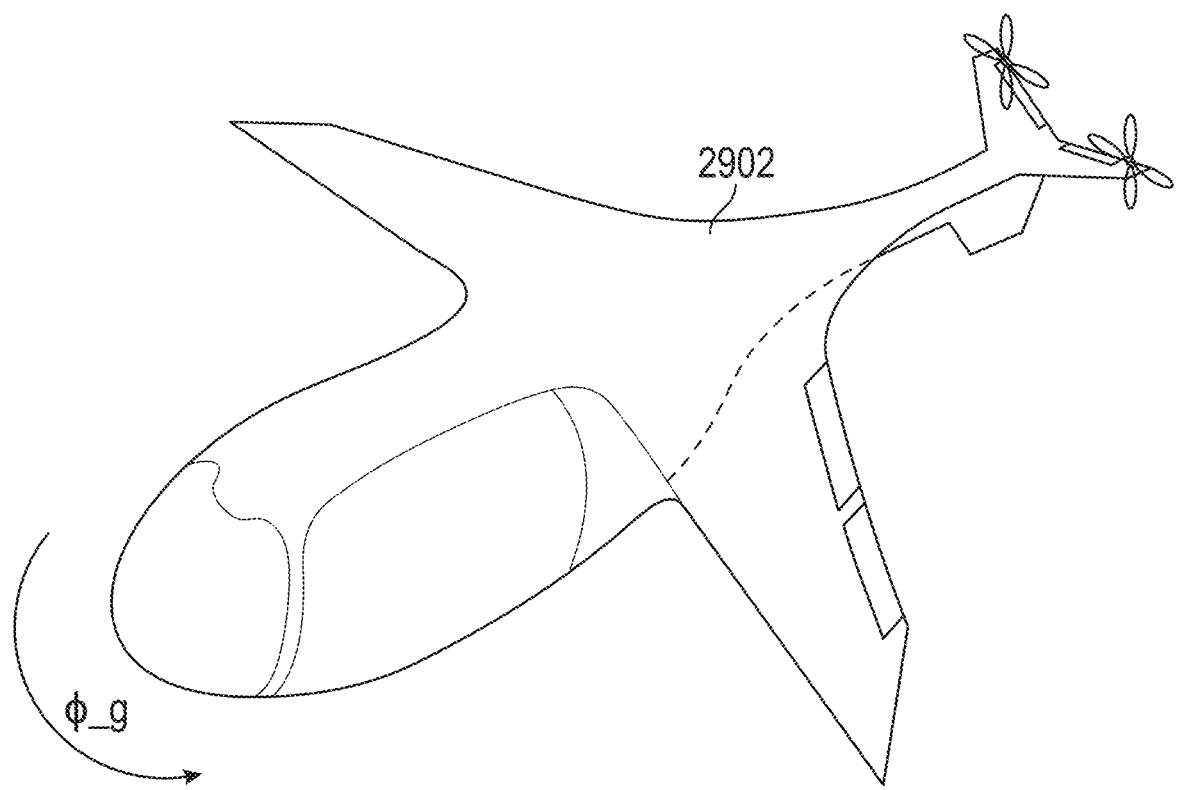
FIG. 31 illustrates roll of a vehicle, according to some examples.

The operation 230 can optionally include determining a vehicle orientation estimate in the operation 2840, which estimates an orientation of the aircraft in north-east-down (NED) frame using various sensors, such as accelerometers and gyroscopes. In a first variant, the position of the nadir range pixel (A) in the Kx-Ky slice corresponds to the radar roll angle estimate and radar pitch angle estimate relative to the vehicle body frame, respectively. The wavenumber angles Kx and Ky of the nadir range pixel can be transformed into NED coordinate frame to yield radar roll angle and radar pitch angle estimates. An example of the radar pitch angle is shown in FIG. 31. In an example, the azimuth angles and elevation angles of the antenna receive element mapping to the nadir range bin directly returns a radar roll and pitch estimates, respectively. In a second variant, the radar pitch and roll angles determined in the first variant can be fused in the operation 2860 with INS (e.g., to limit the drift of INS roll and pitch), since radar can provide a direct measurement of pitch angle and roll angle and INS must be integrated multiple times (and is thus susceptible to temporal drift). However, radar pitch and roll can be otherwise suitably determined.

Heading in a NED reference frame can be determined by INS sensors and/or additional aircraft sensors (e.g., magnetic compass). In variants, heading is not directly observable from a data cube without a map (e.g., prior map, SLAM techniques, etc.), but can be obtained by other sensors, such as a magnetometer, gyrocompass, GPS heading, and/or any other suitable sensors. Heading can additionally be estimated from the data cube by fusing the horizontal velocity estimate (e.g., as determined in the operation 2850) with the INS heading estimate (which is subject to drift in the same way as INS roll and INS pitch). However, heading can be otherwise suitably determined.

The operation S130 can include estimating a horizontal velocity in the operation 2850, which provides horizontal velocity which can be used for odometry and/or provided as one of the estimated vehicle state parameters to aid in aircraft navigation, guidance, and control. The operation 2850 can include removing the contribution of vertical velocity in an operation 2852 and determining a doppler gradient descent vector in an operation 2854. However, the operation 2850 can include any other suitable elements.

The vertical velocity removed in an operation 2852 can be determined as in the operation 2830, determined based on a previous velocity estimate (e.g., generated from a previous nadir pixel and/or previous INS measurements), determined based on a fused radar and INS velocity vector, and/or otherwise suitably determined. The contribution of vertical (geo-motion) velocity can be removed from doppler by transforming the doppler (range rate) measurements by a shifting and/or scaling the doppler values across the data cube (e.g., adjusted based on viewing angle relative to nadir range pixel, subtracting the vertical component of the resulting velocity vector). However, the vertical velocity component can be otherwise suitably removed from the data cube with any suitable timing (e.g., before any suitable processing steps).

With the removed vertical velocity, the operation 2850 can include estimating the Doppler bin with the maximum intensity value for each pixel in Kx-Ky space. Additionally or alternately, 2850 can include estimating the Doppler bin with the highest intensity in the Kx-Ky space. This 'max doppler intensity bin' plot (an example as illustrated in FIGS. 13, 17, 21, and 25, top right) can optionally scale, offset, or otherwise adjust the doppler scale (such that it is centered at 0) with a uniform or dynamically determined offset, such as based on nadir pixel range rate, average range rate, or other central tendency metric. In a specific example, the max doppler is shifted by −64 (e.g., so the doppler scale is centered at 0).

In an embodiment, the operation 2850 can include determining a doppler gradient descent vector in an operation 2854, which functions to generate a radar estimate for horizontal geo-motion from the 'max intensity doppler bin' plot in the Kx-Ky slice. In a first variant, the operation 2854 can include calculating the gradient of the scalar field (doppler value)—which yields a vector in 2D (in the Kx-Ky space). The magnitude of this 2D vector can be directly taken as a radar estimate of horizontal vehicle speed in the vehicle's body frame. The direction of this 2D vector can be taken as a direction of horizontal vehicle motion in the vehicle frame, which can be fused with INS sensor data and/or air data to minimize INS heading drift in an operation 2860. It should be noted that in an aircraft (particularly VTOL aircrafts and/or helicopters that are capable of lateral translation), the presence of aerodynamic sideslip means that in some instances heading can vary independently of vehicle motion. Accordingly, the direction of vehicle motion relative to the terrain (in NED frame) determined in the operation 2852 can optionally be fused with INS sensing to minimize the drift in INS heading determinations, which can be used in lieu of external heading and/or to validate external heading (e.g., GPS, magnetometer). However, the doppler gradient descent vector can be otherwise suitably determined and/or the horizontal aircraft motion can be otherwise suitably determined. In an embodiment, the processor 122 can be used to perform the operation 130 a described with respect to FIG. 28.

Additionally or alternately, horizontal velocity can be backed out from a local position (e.g., or global position) estimate, as the derivative of position change from indirect methods and/or sensing techniques (e.g., identifying known ground fiducials such as established landing sites). However, the horizontal velocity can be otherwise suitably estimated.

In the operation 230 any suitable observability conditions relative to the datacube can be defined. In variants: altitude above the ground can be persistently observable; roll can be observable with Kx bins>1; pitch can be observable with Ky bins>1; vertical velocity can be observable with doppler bins>1; horizontal speed can be observable with doppler bins>1; direction of motion in NED (a.k.a. ground sideslip angle) can be observable with doppler bins>1, Kx bins>1, and Ky bins>1. In variants, a single snapshot of the data cube combined with heading allows for doppler odometry. In variants, doppler can naturally filter objects moving (e.g., relative to the ground) from influencing the velocity estimate. In such variants, when estimating geo-motion reducing/mitigating/filtering the influence of such (moving object) observations from consideration can be performed.

In the operation 230, embodiments can return altitude (e.g., height above ground level, height above sea level), pitch, roll, heading, vertical velocity, horizontal velocity (e.g., speed and/or direction), and/or any other suitable parameters as vehicle state estimate.

The operation 230 can optionally include fusing the radar vehicle state estimate with other aircraft sensing in the operation 2860, which functions to merge various distinct vehicle state estimates into a unified estimate for the vehicle navigation system (VNS) and/or minimize drift of one or more vehicle state parameters. In a first variant, the operation 2860 can occur with the VNS (e.g., using the described Kalman filtering and/or fault detection techniques) described in U.S. application Ser. No. 16/721,523, filed 19 Dec. 2019, which is incorporated herein in its entirety by this reference. In addition, during the operation 2860 data can be fused with inertial (e.g., INS, IMU) data, GNSS/GPS data (if available), air data, and/or any other suitable sensor data. In a second variant, the aircraft can rely on GNSS/GPS as a source of data. In a third variant, a radar vehicle state estimate generated in the operation 230 by radar-based sensing can provide a cross-check and/or validation of GPS/GNSS data. However, the radar vehicle state estimate can be otherwise suitably fused with other aircraft sensors and/or extra-vehicular sensors.

In a specific example, angular rates obtained from INS or multiple radars on the vehicle 2902 with a known baseline can help reduce noise and odometry drift. An INS can measure roll $\varphi$ and pitch $\theta$ with respect to the local gravity vector, which can be aligned with in a down direction, as shown with reference to FIG. 29. Due to a local terrain gradient, the nadir range may not necessarily straightdown, so the radar-measured roll $\varphi\_g$ (FIG. 31), pitch $\theta\_g$, and vertical velocity V is with respect to a ground normal vector. By integrating the model with the INS, the terrain gradient can be estimated, allowing odometry determination of altitude above mean sea level (rather than above ground level). Similarly, in the absence of an external heading reference, the measured ground sideslip $\beta g$ and horizontal speed can be used to limit the drift of the INS heading $\psi$.

However, the vehicle state estimate can be otherwise suitably determined.

In embodiments, the method 200 can optionally include determining a vehicle position based on the vehicle state estimate determined in the operation 240, which can function to determine the position of the aircraft relative to a prior position estimate, the last available GNSS/GPS coordinate position, a geo-referenced position, a position on a map (e.g., for implementations in conjunction with SLAM). The updated vehicle position can subsequently be used to operate the vehicle (e.g., for navigation, tracking). The determined vehicle position can be local (e.g., position change relative to a prior location), global (e.g., global geo-position), and/or be otherwise suitably determined in any suitable reference frame. The operation 240 can determine odometry based on the estimated velocity (e.g., horizontal, absolute) and a prior position estimate, the last available GNSS/GPS coordinate position, a geo-referenced position, a position on a map (e.g., for implementations in conjunction with SLAM). An updated vehicle position can be determined by integrating horizontal velocity (e.g., or fused velocity if multiple redundant techniques and/or sensors are implemented) to determine change in position over time and adding the change in position to the prior vehicle pose. Alternatively, the updated vehicle position can be determined using a Kalman filter, Gaussian process, or other method. Relative position of multiple points, in conjunction with the vehicle state estimate, can generate a 6 DoF pose including (for Euler angles): latitude, longitude, altitude, pitch, yaw, and roll, pose in SO(3), and/or pose in any equivalent reference frame. Alternately, the position can be limited to three DoF (positional only), two DoF (e.g., latitude/longitude coordinate position only, NE reference only), and/or be otherwise suitably implemented. In variants, vehicle position and/or pose estimates can rely on rigid body assumptions but can alternately exclude rigid body assumptions. However, a vehicle position can be otherwise suitably determined.

Figure 30:
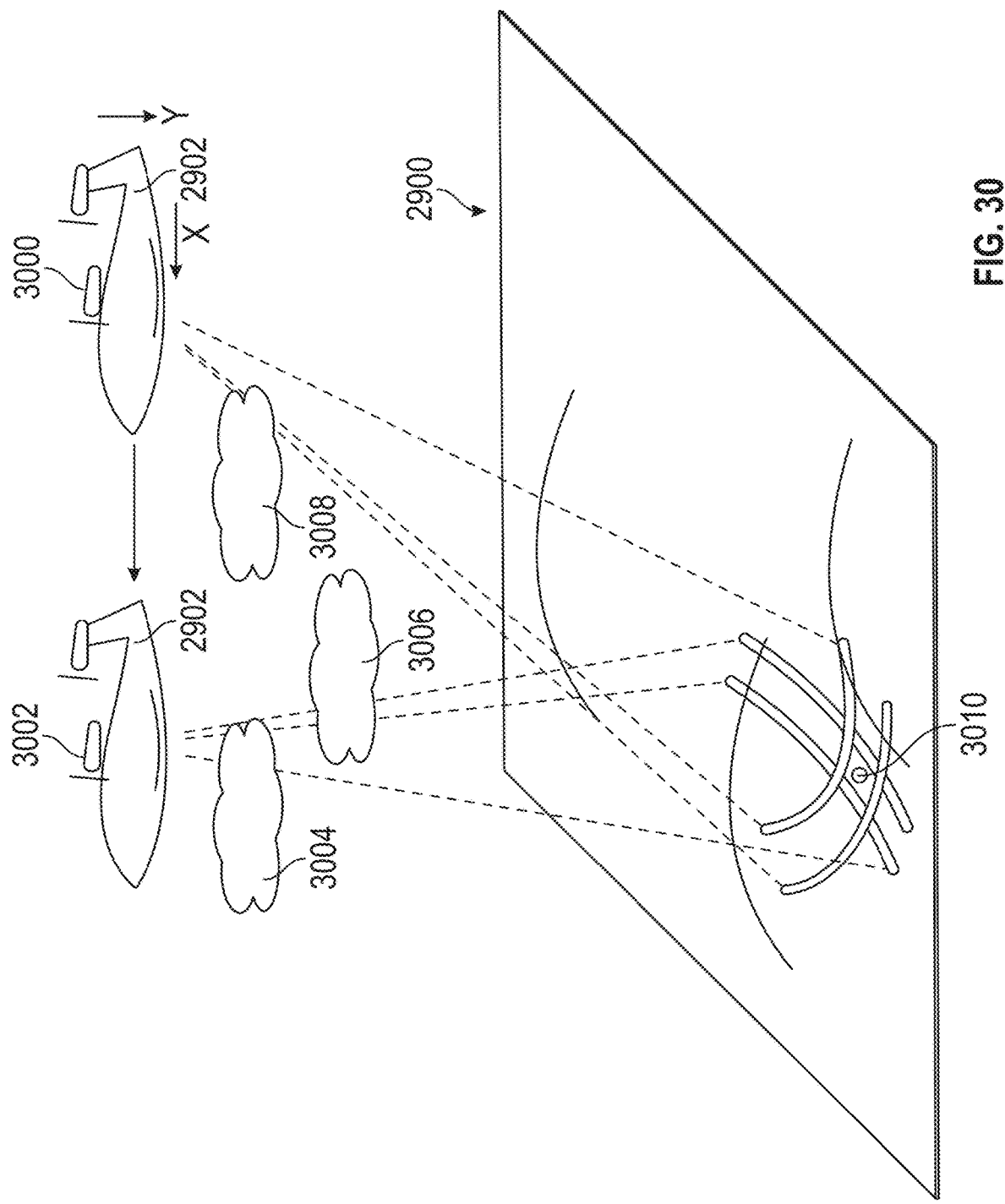
FIG. 30 is a schematic representation of an example radar swath in a variant of the method, according to some examples.

Variations of the technology can afford several benefits and/or advantages. First, variations of this technology can improve the robustness of local position estimation using radar-based terrain-relative navigation (TRN) techniques. Such variations can operate without persistent GPS/GNSS data-which can be unavailable as GPS/GNSS data can be jammed or spoofed. Second, radar-based TRN is susceptible to less drift than inertial navigation sensors (INS) and, accordingly, can provide robust sensing when used in conjunction with lower cost INS components. It can be prohibitively expensive to provide low drift/high accuracy INS components which can operate without a persistent GPS/ GNSS. In such variations, radar-based TRN and/or fused radar and INS data can provide more robust/accurate local position estimates than would be achievable with INS data alone. Accordingly, variations of the technology can enable low-drift velocity odometry, higher accuracy local position estimation (e.g., with or without correlation and/or pattern matching), and/or global position estimation (e.g., with a map). Third, radar-based TRN can operate independently of viewing conditions (an example is shown in FIG. 30), which can impair optical sensing (e.g., camera, Lidar) which depend on clear view of terrain (e.g., optical sensing is ineffective in clouds/fog). As may be seen with reference to FIG. 30, the vehicle 2902 may travel from a position 3000 to a position 3002, where obstructions 3004-3008, such as cloud cover, smoke may inhibit a direct line of sight to the target 2900 and a determined voxel 3010. In an embodiment, the voxel 3010 can correspond to the nadir range pixels 1200, 1600, and 1700. Since scenarios can be expected where both GPS/GNSS data and optical sensing data are unavailable, it can be favorable to rely upon radar as a backup for GPS/GNSS instead of optical sensors. Fourth, variations of the technology can leverage use of raw radar data to improve the robustness of the resulting estimate(s). Radar systems typically pre-process raw radar data and estimate altitude or tracks for strongly reflecting objects (e.g., detect and avoid). However, high-performance TRN can be difficult to achieve with high-level radar data (e.g., pre-processed radar data) due to its sparsity. In variations, radar-based TRN with estimation algorithms applied directly to raw data (e.g., 'direct' methods) can significantly improve matching/correlation performance.

Figure 32:
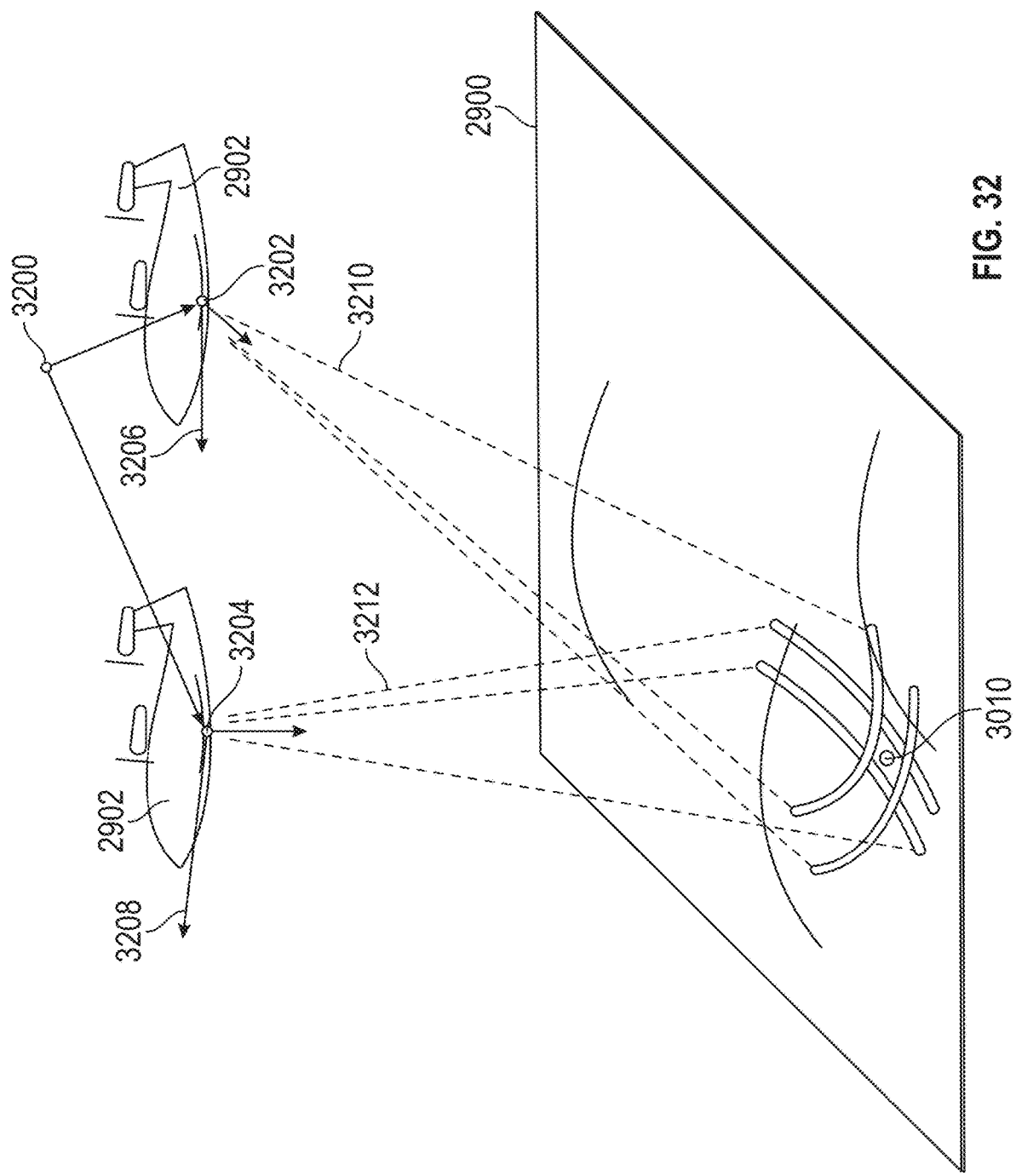
FIG. 32 illustrates a schematic representation of an example pose of a vehicle, in accordance with examples.

FIG. 32 illustrates a schematic representation of an example pose of the vehicle 2902, in accordance with examples. FIG. 32 shows a local origin 3200 from which origins 3202 and 3204 of the vehicle 2902 reference. In an embodiment, the origin 3203 corresponds to a first position of the vehicle 2902 while the origin 3203 corresponds to a second position of the vehicle 2902. In an embodiment, when the vehicle is at a position correlating to the origin 3202, the vehicle is traveling at velocity $v_i$ 3206. In addition, when the vehicle is at a position correlating to the origin 3204, the vehicle is traveling at velocity $v_j$ 3206. Moreover, the origin 3202 has data points $p_i$, $R_i$ associated therewith and the origin 3204 has the data points $p_j$, $R_j$ associated therewith.

Vector $\ddot{k}_i$ 3210 can be associated with the origin 3202 in FIG. 32 and vector $\ddot{k}_j$ 3212 can be associated with the origin 3204 in FIG. 32. In addition, data cube processing (Si) for a point within one of the graphical representations 800 or 900 can be defined according to the following:

$S_{D,i} = S_i(r_i, \dot{r}_i, \ddot{k}_{s,i}[x], \ddot{k}_{s,i}[y])$, where $r_i = |p_D - p_i|$, $\dot{r}_i = \ddot{k} \cdot v_i$, $\ddot{k}_{s,i} = R_i \ddot{k}_i$. Furthermore, $\ddot{k}_i = (p_D - p_i)/r_i$ and $R_i = R(\psi_i, \theta_i, \varphi_i)$, where $\varphi_i$ corresponds to roll of the vehicle 2902 at origin 3202.

Figure 33:
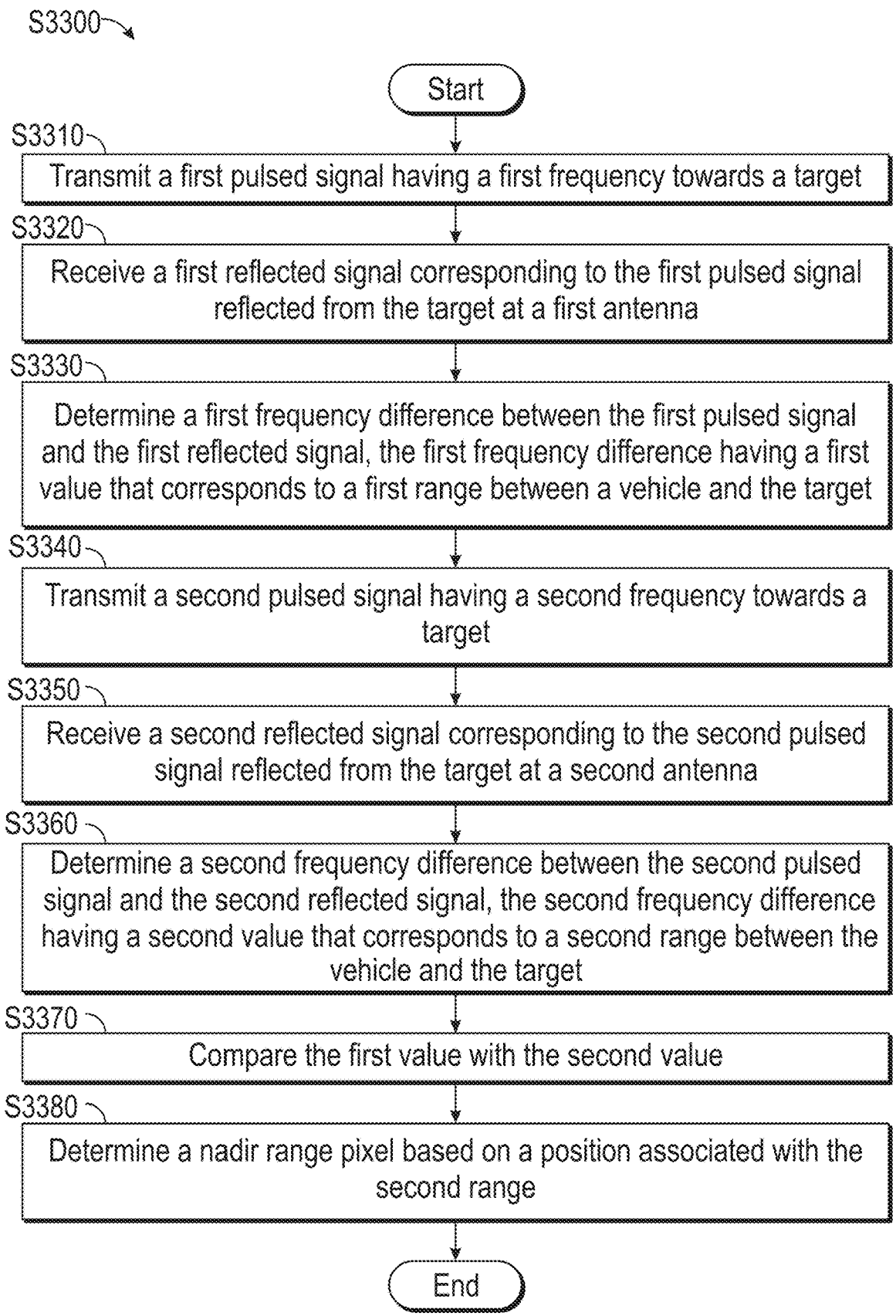
FIG. 33 illustrates a method of determining a nadir range pixel, according to some examples.

Now making reference to FIG. 33, a method 3300 for determining a position of a vehicle is shown. Initially, in an operation 3310, a first pulsed signal having a first frequency is pulsed towards a target. For example, the pulsed signal 500 is pulsed towards the target 2900. In an operation 3320, a first reflected signal that corresponds to the first pulsed signal reflected from the target is received at a first antenna. In the example, during the operation 3320, the reflected signal 600 reflected from the target 2900 is received at one of the antennae 111A-111N.

In an operation 3330, a first frequency difference is determined between the first pulsed signal and the first reflected signal. In embodiments, the first frequency difference has a first value that corresponds to a first range between a vehicle and the target. To further illustrate, in the example, a frequency difference between the pulsed signal 500 and the reflected signal 600 is determined in the operation 3330. The frequency difference can be indicative of return power.

In an operation 3340, a second pulsed signal having a second frequency is pulsed towards a target. For example, the pulsed signal 502 is pulsed towards the target 2900. In an operation 3350, a second reflected signal that corresponds to the second pulsed signal reflected from the target is received at a second antenna. In the example, during the operation 3350, the reflected signal 602 reflected from the target 2900 is received at one of the antennae 111A-111N.

In an operation 3360, a second frequency difference is determined between the second pulsed signal and the second reflected signal. In embodiments, the second frequency difference has a second value that corresponds to a second range between a vehicle and the target. In the example, a frequency difference between the pulsed signal 502 and the reflected signal 602 is determined in the operation 3360. The frequency difference can be indicative of return power.

Returning to FIG. 32 and the method 3300, during an operation 3370, the values for the first and second frequencies are compared in order to determine a nadir range pixel based on a position associated with the second range. In the example, the second value associated with the second frequency is greater than the first value associated with the first frequency. Therefore, the position associated with the second range is determined to the nadir range pixel in an operation 3380. In the example, since the reflected signal had the greater value (i.e., a voltage associated the reflected signal 602 was greater than a voltage associated with reflected signal 600), the position associated with the range for the second reflected signal 602 can be selected as the nadir range pixel in the operations 3370 and 3380. In an embodiment, the nadir range pixel can be associated with the strongest reflected signal, as indicated by a voltage associated with a reflected signal. Moreover, in an embodiment, a position associated with the range can be determined as discussed above.

It should be noted that variations of the technology can additionally or alternately provide any other suitable benefits and/or advantages.

In an embodiment, a technical effect includes providing a positioning system and a positioning method that provides accurate positioning having high integrity and availability and is continuous. In particular, embodiments use radar componentry including transmitters and receivers along with antennae, which may be used receive signals emitted by the transmitters that are reflected from targets. The radar componentry is capable of working in almost all conditions, cloud cover, rain conditions, snow conditions, open water applications, and the like. Specifically, the systems and methods disclosed herein provide the technical effect of vehicle positioning in three-dimensions in order to ensure to that the vehicle may clear any type of potential obstacles. Furthermore, the systems and methods disclosed herein provide the technical effect of determining a vehicle velocity.

Alternative embodiments implement the above methods and/or processing modules in non-transitory computer-readable media, storing computer-readable instructions. The instructions can be executed by computer-executable components integrated with the computer-readable medium and/ or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the Figures and claims, modifications and changes can be made to the preferred embodiments of the invention without departing from the scope of this invention defined in the following claims.

What is claimed is:

1. A method for determining a position of a vehicle having a transmitter and at least two antenna each associated with a receiver, the method comprising:
   (A) transmitting a first pulsed signal towards a target, the first pulsed signal having a first frequency;
   (B) receiving a first reflected signal from the target at a first antenna of the at least two antenna, the first reflected signal corresponding to the first pulsed signal reflected from the target;
   (C) determining a first frequency difference between the first pulsed signal and the first reflected signal, the first frequency difference corresponding to a first range between the vehicle and the target, the first frequency difference having a first value;
   (D) transmitting a second pulsed signal towards the target, the second pulsed signal having a second frequency;
   (E) receiving a second reflected signal from the target at a second antenna of the at least two antenna, the second reflected signal corresponding to the second pulsed signal reflected from the target;
   (F) determining a second frequency difference between the second pulsed signal and the second reflected signal, the second frequency difference corresponding to a second range between the vehicle and the target, the second frequency difference having a second value greater than the first value;
   (G) comparing the first value with the second value;
   (H) determining that a position associated with the second reflected signal is a nadir range pixel, the nadir range pixel corresponding to the second range; and
   (I) determining a velocity of the vehicle based on the first range and the second range, the determining the position is based on the velocity and the position corresponds to a vehicle position.

2. The method of claim 1, further comprising beamforming the velocity of the vehicle.

3. The method of claim 1, further comprising determining an angle between the vehicle and the target based on the first range and the second range.

4. The method of claim 3, further comprising determining a doppler with a Fourier Transform of the velocity.

5. The method of claim 1, further comprising:
   performing operations (A)-(F) in an azimuth direction; and
   performing operations (A)-(F) in an elevation direction.

6. The method of claim 5, further comprising beamforming the velocity for each of the azimuth direction and the elevation direction.

7. The method of claim 1, wherein the first frequency is determined using stretch processing between the first pulsed signal and the first reflected signal and the second frequency is determined using stretch processing between the second pulsed signal and the second reflected signal.

8. The method of claim 1, wherein the position is determined from the velocity by determining a Fourier Transform of the velocity.

9. A method for determining a position of a vehicle having a transmitter and at least two antenna each associated with a receiver, the method comprising:
   (A) transmitting a first pulsed signal towards a target, the first pulsed signal having a first frequency;
   (B) receiving a first reflected signal from the target at a first antenna of the at least two antenna, the first reflected signal corresponding to the first pulsed signal reflected from the target;
   (C) determining a first frequency difference between the first pulsed signal and the first reflected signal, the first frequency difference corresponding to a first range between the vehicle and the target;
   (D) transmitting a second pulsed signal towards the target, the second pulsed signal having a second frequency;
   (E) receiving a second reflected signal from the target at a second antenna of the at least two antenna, the second reflected signal corresponding to the second pulsed signal reflected from the target;
   (F) determining a second frequency difference between the second pulsed signal and the second reflected signal, the second frequency difference corresponding to a second range between the vehicle and the target;
   (G) comparing the first range with the second range to determine an angle;
   (H) determining a velocity of the vehicle based on the first range and the second range; and
   (I) determining a position of the vehicle based on the velocity and the angle.

10. The method of claim 9, further comprising beamforming the velocity of the vehicle.

11. The method of claim 9, further comprising:
    determining a doppler with a Fourier Transform of the velocity.

12. The method of claim 9, further comprising:
    performing operations (A)-(F) in an azimuth direction; and
    performing operations (A)-(F) in an elevation direction.

13. The method of claim 12, further comprising beamforming the velocity for each of the azimuth direction and the elevation direction.

14. The method of claim 9, wherein the first frequency is determined using stretch processing between the first pulsed signal and the first reflected signal and the second frequency is determined using stretch processing between the second pulsed signal and the second reflected signal.

15. The method of claim 9, wherein the position is determined from the velocity by determining a Fourier Transform of the velocity.

16. A system for determining a position of a vehicle, the system comprising:
    a transmitter configured to:

transmit a first pulsed signal towards a target, the first pulsed signal having a first frequency; and
transmit a second pulsed signal towards the target, the second pulsed signal having a second frequency;

a receiver configured to:
  receive a first reflected signal from the target at a first antenna of at least two antenna, the first reflected signal corresponding to the first pulsed signal reflected from the target; and
  receive a second reflected signal from the target at a second antenna of the at least two antenna, the second reflected signal corresponding to the second pulsed signal reflected from the target;

a processor configured to:
  determine a first frequency difference between the first pulsed signal and the first reflected signal, the first frequency difference corresponding to a first range between the vehicle and the target, the first frequency difference having a first value;
  determine a second frequency difference between the second pulsed signal and the second reflected signal, the second frequency difference corresponding to a second range between the vehicle and the target, the second frequency difference having a second value greater than the first value;
  compare the first value with the second value;
  determine that a position associated with the second reflected signal is a nadir range pixel, the nadir range pixel corresponding to the second range; and
  determine a velocity of the vehicle based on the first range and the second range, the determining the position is based on the velocity and the position corresponds to a vehicle position.

17. The system of claim 16, wherein the processor is configured to beamform the velocity of the vehicle.

18. The system of claim 16, wherein the processor is configured to:
  determine an angle between the vehicle and the target based on the first range and the second range; and
  determine a doppler with a Fourier Transform of the velocity.

19. The system of claim 16, wherein processor is further configured to:
  determine the first frequency using stretch processing between the first pulsed signal and the first reflected signal; and
  determine the second frequency using stretch processing between the second pulsed signal and the second reflected signal.

20. The system of claim 16, wherein the processor is further configured to determine the position from the velocity by determining a Fourier Transform of the velocity.

* * * * *